United States Patent
Gammans

(10) Patent No.: US 10,353,889 B2
(45) Date of Patent: Jul. 16, 2019

(54) MONITORING ALIGNMENT OF COMPUTER FILE STATES ACROSS A GROUP OF USERS

(71) Applicant: ULTRALIGHT TECHNOLOGIES INC., Calgary (CA)

(72) Inventor: Charles C. Gammans, Calgary (CA)

(73) Assignee: ULTRALIGHT TECHNOLOGIES INC., Calgary, CA (US)

( * ) Notice: Subject to any disclaimer, the term of this patent is extended or adjusted under 35 U.S.C. 154(b) by 321 days.

(21) Appl. No.: 15/242,127

(22) Filed: Aug. 19, 2016

(65) Prior Publication Data
US 2017/0060936 A1 Mar. 2, 2017

(30) Foreign Application Priority Data

Aug. 26, 2015 (CA) .................................... 2901619

(51) Int. Cl.
*G06F 7/02* (2006.01)
*G06F 16/00* (2019.01)
(Continued)

(52) U.S. Cl.
CPC ...... *G06F 16/2365* (2019.01); *G06F 16/1787* (2019.01); *G06F 16/2358* (2019.01); *G06F 16/951* (2019.01); *H04L 67/42* (2013.01)

(58) Field of Classification Search
CPC ......... G06F 17/30368; G06F 17/30864; G06F 17/30371; G06F 8/71; G06F 16/2358;
(Continued)

(56) References Cited

U.S. PATENT DOCUMENTS

| 6,182,080 | B1 * | 1/2001 | Clements | ............... G06F 16/10 |
| | | | | 707/610 |
| 2007/0162579 | A1 * | 7/2007 | Lawrence | ......... G06F 17/30899 |
| | | | | 709/223 |

(Continued)

OTHER PUBLICATIONS

Written Opinion of the International Searching Authority dated Sep. 29, 2016 in counterpart International Application No. PCT/CA2016/050980.

(Continued)

*Primary Examiner* — Bruce M Moser
(74) *Attorney, Agent, or Firm* — ATMAC Patent Services Ltd.; Andrew T. MacMillan

(57) ABSTRACT

A first state identifier is determined according to the state of a first file at a first time point, and a second state identifier is determined according to the state of a second file at a second time point. The first and second state identifiers are compared and an alignment indication is displayed to a user of a client device thereby making the user aware of the alignment state between the files. The files may be associated with different client devices or different users thereby showing group alignment. The files may also be associated with a single user or client device thereby showing local alignment. The state identifiers may include digest hashes of content of the first and second files, metadata, or state information regarding the files. The files may be encrypted and access check keys utilized to determine whether a client device is authorized to receive an encrypted file.

20 Claims, 17 Drawing Sheets

(51) Int. Cl.
    *G06F 16/23* (2019.01)
    *G06F 16/951* (2019.01)
    *H04L 29/06* (2006.01)
    *G06F 16/178* (2019.01)

(58) Field of Classification Search
    CPC .. G06F 16/951; G06F 16/955; G06F 16/2365; G06F 17/30176; G06F 16/1787; H04L 67/30176; H04L 67/42
    See application file for complete search history.

(56) References Cited

U.S. PATENT DOCUMENTS

| | | | |
|---|---|---|---|
| 2007/0283321 | A1 | 12/2007 | Hegde et al. |
| 2008/0140732 | A1 | 6/2008 | Wilson et al. |
| 2010/0223469 | A1* | 9/2010 | Hussain .................. G06F 21/64 713/175 |
| 2013/0173530 | A1 | 7/2013 | Laron |
| 2016/0019210 | A1* | 1/2016 | O'Brian ................ G06F 16/955 707/747 |
| 2016/0350326 | A1* | 12/2016 | Simonetti ........... H04L 67/1095 |

OTHER PUBLICATIONS

Office action dated Dec. 23, 2015 mailed by the Canadian Intellectual Property Office (CIPO) in counterpart Canadian patent application No. 2,901,619 (4 pages).

Office action dated Mar. 14, 2016 mailed by the Canadian Intellectual Property Office (CIPO) in counterpart Canadian patent application No. 2,901,619 (3 pages).

Wikipedia, "Version control", downloaded on Nov. 20, 2018 from https://en.wikipedia.org/wiki/Version_control.

Atlassian, "What is version control", downloaded on Nov. 20, 2018 from https://www.atlassian.com/git/tutorials/what-is-version-control.

Wikipedia, "Comparison of version control software", downloaded on Nov. 20, 2018 from https://en.wikipedia.org/wiki/Comparison_of_version_control_software.

* cited by examiner

Client device

Computer server

Icon overlay on client

Filename and location independence

Upload with optional encryption by client

Encrypted file download process

Other alignment icon examples

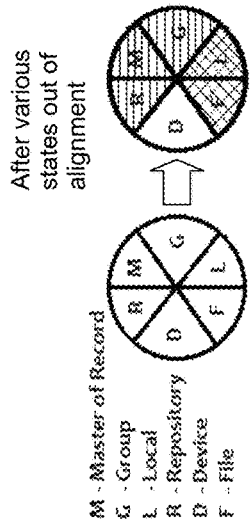

After various states out of alignment

M - Master of Record
G - Group
L - Local
R - Repository
D - Device
F - File

R - Indicates alignment state between a specific file and their repository.

D - Indicates alignment state between all file instances a user has distributed across all of their devices.

F - Indicates alignment state between all file instances a user has distributed across all file systems connected to one of their devices.

FIG. 16

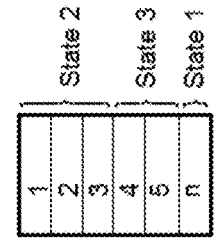

FIG. 18

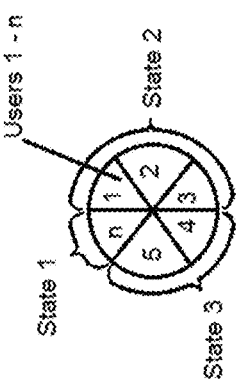

FIG. 17

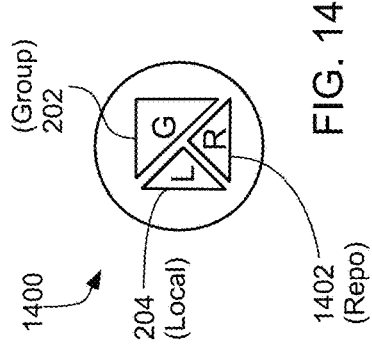

FIG. 14

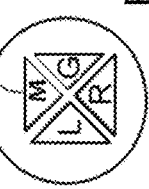

FIG. 15

| Diff tool | Accept and declare | Download only | | | Conversation explorer<br>1500 | |
|---|---|---|---|---|---|---|

| | Doc ID | Email | User ID | Topic | Comment | Status | Access | Suggested File Name | Pass-phrase |
|---|---|---|---|---|---|---|---|---|---|
| 204 | 416 | a@calsys.com | 1 | Ultralight specs | | | SHARED/LOCAL | Ultraligh Specs.doc | (none) |
| 204 | C22 | b@acme.com | 2 | Software Specifications for Ultralight | Providing estimates on menu add-on component | IN PROGRESS | SHARED/LOCAL | | ****** |
| 204 | 416 | c@build.com | 3 | Ultralight Specs | | | LOCAL | Ultralight Specs.doc | (none) |
| 204 | E75 | d@acme.com | 4 | Ultralight Specs | | APPROVED | | GCS Specifications for Ultraligh.docx | (none) |

FIG. 19

Accessibility icon examples

| Icon | Filename | Description |
|---|---|---|
| | local.png | local — in repository |
| | local_and_shared.png | here — on file system |
| | local_and_shared_here.png | shared — on cloud and shared by other user (or by me) |
| | local_here.png | no_access — not shared and I don't have any way to get it |
| | no_access.png | locked — is encrypted but I have not yet unlocked it |
| | not_shared_but_have_common.png | unlocked — is encrypted, but I have previously entered the valid passphrase. |
| | shared.png | have_common — not shared by other user, but someone else has shared it with me, so there is a valid way to link to it without violating privileges |
| | shared_here.png | |
| | shared_locked.png | |
| | shared_unlocked.png | |

FIG. 20

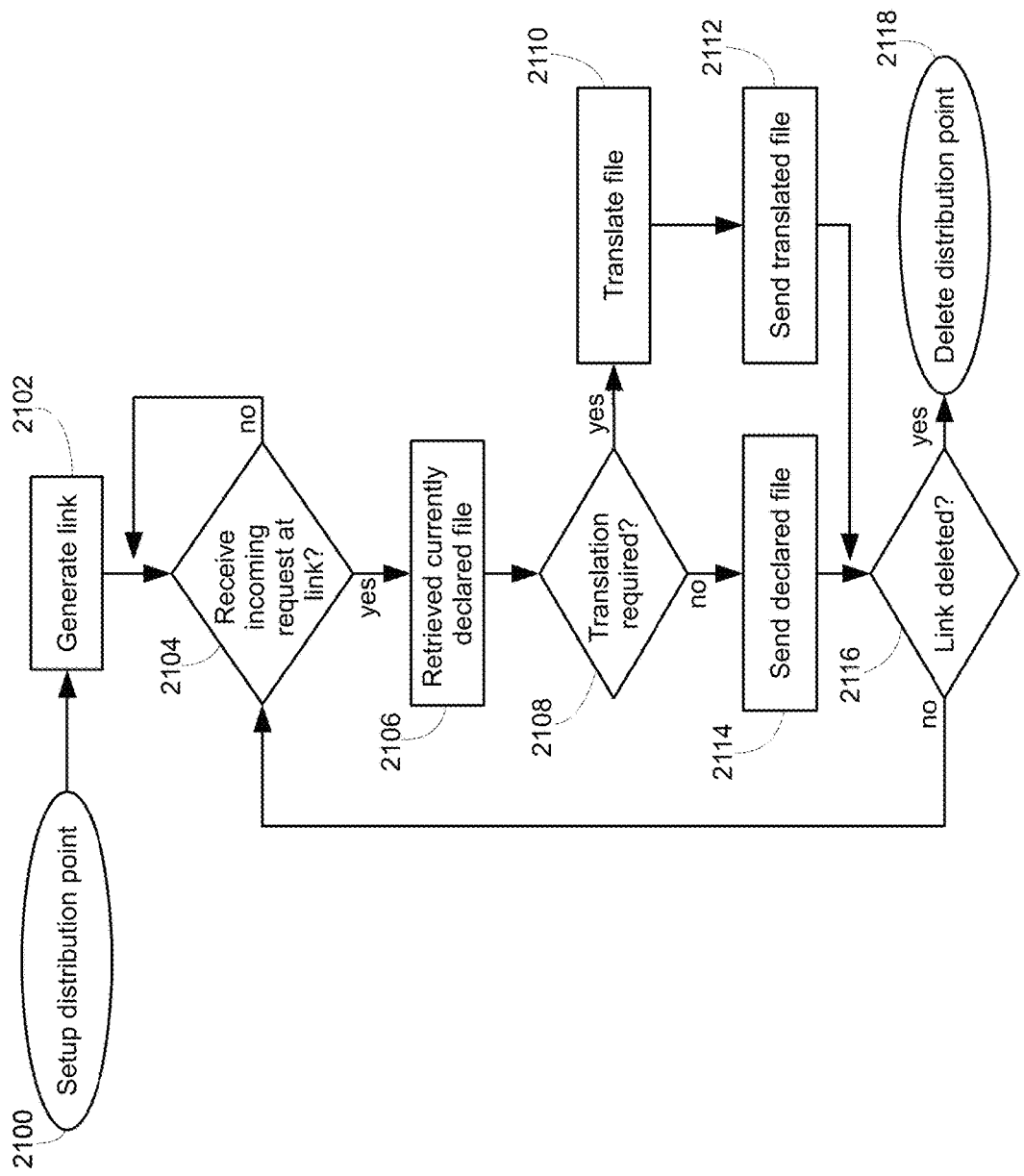

MONITORING ALIGNMENT OF COMPUTER FILE STATES ACROSS A GROUP OF USERS

CROSS-REFERENCE TO RELATED APPLICATIONS

This application claims the benefit of priority of Canadian Patent Application No. 2,901,619 filed Aug. 26, 2015, which is incorporated herein by reference.

BACKGROUND OF THE INVENTION (1) Field of the Invention

The invention pertains generally to revision control of computer files. More specifically, the invention relates to allowing groups of users working independently on a common task or project to monitor whether the states of their files are aligned with each other.

(2) Description of the Related Art

A typical version control system (VCS) saves each successive version of a document so that a user may at any time compare a current version of the document with an earlier version, and may revert back to the earlier version if so desired. Version control may be combined with a cloud-based document editing platform in order to allow multiple users to modify a single document and keep track of changes. For example, the well-known Wikipedia® online encyclopedia automatically keeps track of all previous versions of articles and allows an online user to easily compare and see differences between any versions of the same article. In another example, Google Docs® cloud-based collaborative word processor allows multiple users to simultaneously make changes to a single online document while tracking changes made by each of the users. Users can see changes being made by other users in real time and may accept or reject changes as desired.

Version control systems are also commonly utilized for managing source code files in conjunction with software development. In software development, developers typically work individually on their own set of files because unfinished code by one developer will likely not compile properly and this may prevent another developer from testing an unrelated section of code. In one example solution to this problem, the Mercurial distributed revision control tool allows each developer to have their own local repository of source code files. A master repository is stored on a computer server coupled to a network accessible to the developers. Each developer works on their individual files directly, and pushes new versions of files from their local repository into the master repository when they feel that updated code is ready to be seen by other developers. Any developers working on the project may compare files in their local repositories with any version of the files stored in the master repository to see what earlier changes have been checked in. If so desired, developers may locally clone an entire earlier version taken from the master repository or may pull down individual updated files from any particular version on the master repository.

One problem with these existing central and distributed version control approaches is that, in order to benefit from the version control system, users are required to agree on the most recent (master) version of each document. If two users do not agree on a particular aspect of a document, they may enter into a so-called "edit war" where they repeatedly save conflicting changes into the master version. Alternative technology and further improvements to monitoring alignment of documents between groups of users would be beneficial.

BRIEF SUMMARY OF THE INVENTION

In an exemplary embodiment of the invention, a computerized version control system automatically generates and displays alignment indications to users thereby enabling the users to see whether the state of their files is aligned with both those of other users within the group and locally on a particular client device. Different levels of comparisons may be employed. For instance three levels of compare may be employed including comparisons of hashes calculated according to content of different files, metadata to compare information pertaining to different files, and the actual content of the different files. Comparisons between any state identifiers based on the files may be made in a similar manner. Alignment indications based on differences between the states of files may be displayed in real time as changes occur regardless of whether the users share the content of their files with each other.

An example benefit is some embodiments is that there is no requirement that users agree to a single master version of each file. It is perfectly acceptable for users to continue their work flow while out of alignment. However, at any time they so desire they may easily determine whether they are in alignment and/or what differences exist.

In an example embodiment, a first state identifier is determined according to the state of a first file at a first time point, and a second state identifier is determined according to the state of a second file at a second time point. The first and second state identifiers are compared and an alignment indication is displayed to a user of a client device thereby making the user aware of the alignment state between the files. The files may be associated with different client devices or different users thereby showing group alignment. The files may also be associated with a single user or client device thereby showing local alignment. The state identifiers may include digest hashes of content of the first and second files, metadata, or state information regarding the files. The files may be encrypted and access check keys utilized to determine whether a client device is authorized to receive an encrypted file.

According to an exemplary embodiment of the invention there is disclosed a system including a plurality of client devices associated with a respective plurality of files. The client devices at least include a first client device associated with a first declared file, and a second client device associated with a second declared file. The system further includes a computer server coupled to each of the client devices via a network. The first client device is operable to determine a first state identifier and send the first state identifier to the computer server via the network, the first state identifier corresponding to a state of the first declared file at a first point in time. The second client device is operable to determine a second state identifier and send the second state identifier to the computer server via the network, the second state identifier corresponding to a state of the second declared file at a second point in time, the second point in time being after the first point in time. The computer server is operable to compare the first state identifier and the second state identifier, and then send at least a first message to the first client device via the network, the first message including group alignment status specifying whether the first state identifier equals the second state identifier. The first client device is operable to display a group alignment indication on a user interface of the first client device according to the group alignment status received from the computer server. The group alignment indication thereby making a user of the first client device aware of whether the state of the first declared file at the first point in time matches the state of the second declared file at the second point in time.

According to an exemplary embodiment of the invention there is disclosed a computer server including a network interface coupled via a network to a plurality of client devices associated with a respective plurality of files. The client devices at least include a first client device associated with a first declared file, and a second client device associated with a second declared file. The computer server further includes a storage device, and one or more processors coupled to the network interface and the storage device. By the one or more processors executing software instructions loaded from the storage device, the one or more processors are operable to receive a first state identifier from the first client device and store the first state identifier in the storage device, the first state identifier corresponding to a state of the first declared file at a first point in time. The one or more processors are further operable to receive a second state identifier from the second client device and store the second state identifier in the storage device, the second state identifier corresponding to a state of the second declared file at a second point in time, the second point in time being after the first point in time. The one or more processors are further operable to compare the first state identifier and the second state identifier, and send at least a first message to the first client device via the network. The first message includes group alignment status specifying whether the first state identifier equals the second state identifier. The first client device thereafter displays a group alignment indication on a user interface of the first client device according to the group alignment status received from the computer server. The group alignment indication thereby making a user of the first client device aware of whether the state of the first declared file at the first point in time matches the state of the second declared file at the second point in time.

According to an exemplary embodiment of the invention there is disclosed a method including determining a first state identifier corresponding to a state of first declared file at a first point in time, the first declared file associated with a first client device. The method further includes determining a second state identifier corresponding to a state of a second declared file at a second point in time after the first point in time, the second declared file associated with a second client device. The method further includes storing the first state identifier and the second state identifier at a computer server coupled to the first and second client devices via a computer network. The method further includes comparing by the computer server the first state identifier and the second state identifier. The method further includes sending at least a first message by the computer server to the first client device via the network, the first message including group alignment status specifying whether the first state identifier equals the second state identifier. The method further includes displaying a group alignment indication on a user interface of the first client device according to the group alignment status received from the computer server. The group alignment indication thereby makes a user of the first client device aware of whether the state of the first declared file at the first point in time matches the state of the second declared file at the second point in time.

According to an exemplary embodiment of the invention there is disclosed a method including storing a first state identifier in a storage device, the first state identifier corresponding to a state of a first declared file at a first point in time, the first declared file being associated with a first client device. The method further includes storing a second state identifier in a storage device, the second state identifier corresponding to a state of a second declared file at a second point in time after the first point in time, the second declared file being associated with a second client device. The method further includes comparing the first state identifier and the second state identifier. The method further includes sending at least a first message to the first client device via the network, the first message including group alignment status specifying whether the first state identifier equals the second state identifier; the first client device thereafter displaying a group alignment indication on a user interface of the first client device according to the group alignment status. The group alignment indication thereby makes a user of the first client device aware of whether the state of the first declared file at the first point in time matches the state of the second declared file at the second point in time.

According to an exemplary embodiment of the invention there is disclosed a method including storing a first state identifier, the first state identifier corresponding to a state of a first declared file at a first point in time, the first declared file being associated with a first client device. The method further includes storing a second state identifier, the second state identifier corresponding to a state of a second declared file at a second point in time after the first point in time, the second declared file being associated with a second client device. The method further includes comparing the first state identifier and the second state identifier, and generating group alignment status specifying whether the first state identifier equals the second state identifier. The method further includes displaying a group alignment indication on a user interface according to the group alignment status, the group alignment indication thereby making a user aware of whether the state of the first declared file at the first point in time matches the state of the second declared file at the second point in time.

These and other advantages and embodiments of the present invention will no doubt become apparent to those of ordinary skill in the art after reading the following detailed description of the preferred embodiments illustrated in the various figures and drawings.

BRIEF DESCRIPTION OF THE DRAWINGS

The invention will be described in greater detail with reference to the accompanying drawings which represent preferred embodiments thereof:

FIG. 14 shows an alignment icon that includes a repository alignment indication according to an exemplary embodiment.

FIG. 15 shows an alignment icon that includes a master of record alignment indication according to an exemplary embodiment.

FIG. 16 shows an alignment icon that includes all of a master of record, group, local, repository, device, and file alignment indications in pie graph form according to an exemplary embodiment.

FIG. 17 shows an alignment icon that indicates which users are at which states in pie graph form according to an exemplary embodiment.

FIG. 18, shows an alignment icon that indicates which users are at which states in bar chart form according to an exemplary embodiment.

FIG. 19 illustrates an example of a conversation explorer window showing how a user's working file aligns with the declared files of other users in a particular conversation.

FIG. 20 illustrates examples of different accessibility icons showing a user whether they have remote and/or local access to a file declared by another user.

FIG. 21 illustrates a flowchart describing operations by the computer server of FIG. 1 for handling distribution points according to an exemplary embodiment.

DETAILED DESCRIPTION

Figure 1:
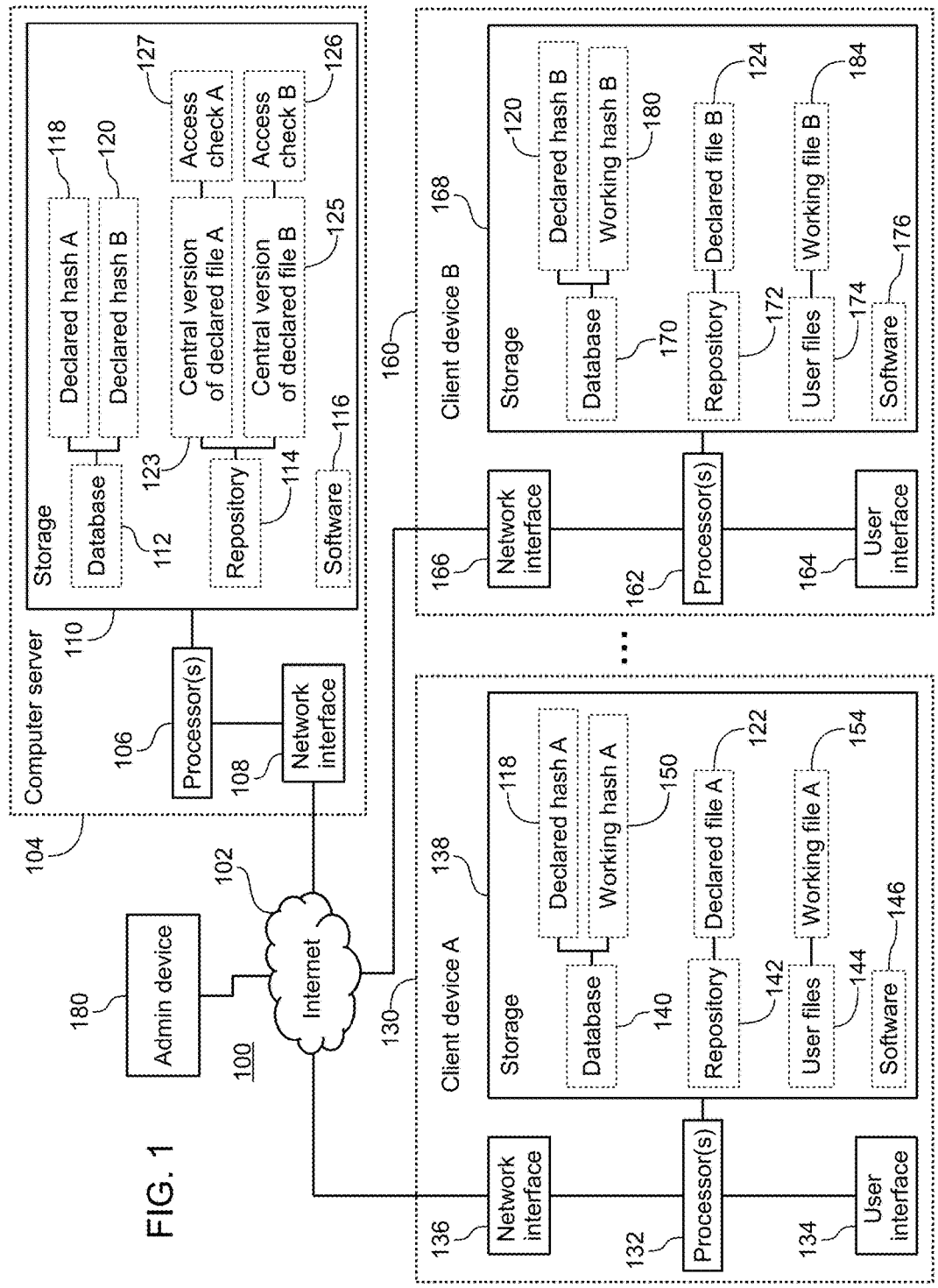
FIG. 1 shows a block diagram of a system for monitoring alignment of files within a group of users according to an exemplary embodiment of the invention.

FIG. 1 shows a block diagram of a system 100 for monitoring alignment of files 122, 154, 124, 184 within a group of users according to an exemplary embodiment of the invention. The system includes a computer server 104 and plurality of client devices 130, 160 operated by the users coupled to a computer network such as the Internet 102. One or more admin devices 180 are coupled to the Internet 102 for remotely administering the server 104 and monitoring the system 100.

The computer server 104 includes one or more processors 106 coupled to a network interface 108 and a storage device 110. The storage device 110 stores therein a central database 112, a central repository 114, and software 116 for execution by the processors 106. To help explain several examples, two declared hash values 118, 120 are shown stored in central database 112. In particular, the database 112 stores a first declared hash 118 calculated according to the contents of first declared file 122 stored at a first client device 130, and the database 112 further stores a second declared hash 120 calculated according to the contents of a second declared file 124 stored at a second client device 160. As shown, in this embodiment, centrally stored versions 123, 125 of the two declared files 122, 124 are stored in the central repository 114. For instance, the centrally stored versions 123, 125 may be encrypted with one or more passphrases known to users of the group but not known to either the computer server 104 or administrators of the server 104.

In this embodiment, the first client device 130 includes one or more processors 132 coupled to a user interface 134, a network interface 136, and a storage device 138. The storage device 138 stores therein a local database 140, a local repository 142, a collection of user files 144, and software 146 for execution by the processors 132. The local database 140 stores the same first declared hash value 118 as is stored in the central database 112 of the computer server 104, and the local repository 142 stores the original version of the first declared file 122. The files in the local repository 142 may be encrypted or unencrypted depending on the situation. Storing the files encrypted is beneficial in case the local repository 142 is actually remote to the client device 130 such as on a network share or a cloud storage service. The user files 144 of the first client device 130 include at least a first working file 154, and the local database 140 further stores a first working hash 150 calculated according to the contents of the first working file 154.

The second client device 160 in this embodiment is similar to the first client device 130. In particular, the second client device 160 includes one or more processors 162 coupled to a user interface 164, a network interface 166, and a storage device 168. The storage device 168 stores therein a local database 170, a local repository 172, a collection of user files 174, and software 176 for execution by the processors 162. The local database 170 stores the same second declared hash value 120 as is stored in the central database 112 of the computer server 104, and the local repository 172 stores the original (unencrypted) version of the second declared file 124. The user files 174 of the second client device 160 include a second working file 184, and the local database 170 further stores a second working hash 180 calculated according to the contents of the first working file 184.

During operation, the first and second client devices 130, 160 allow their respective users to work on the first and second working files 154, 184 along with other files in the user files 144, 174 utilizing any available program such as word processors and spreadsheet programs to name but two examples. Alignment indications are automatically shown to users by the user interfaces 134, 164 as the users work on working files 154, 184. The alignment indications according to an exemplary embodiment of the invention help the users monitor alignment information of both the declared files 122, 124 and the various working files 154, 184 within the group.

Figure 2:
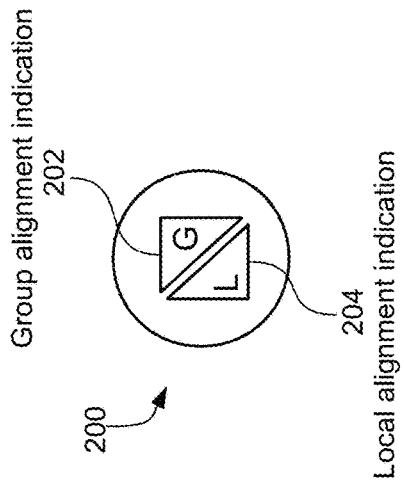
FIG. 2 shows an example of an alignment icon consisting of a group alignment indication and a local alignment indication according to an exemplary embodiment.

FIG. 2 shows an example of an alignment icon 200 consisting of a group alignment indication 202 and a local alignment indication 204. In this embodiment, the color of the group alignment indication 202 is automatically changed when displayed by the user interfaces 134, 164 according to whether the first and second declared hashes 118, 120 stored in the central database 112 of the computer server are the same. Likewise, the color of the local alignment indication 204 is automatically changed when displayed by the user interfaces 134, 164 according to whether the declared and working hash values (118, 150; 120, 180) are the same on a particular client device 130, 160. In preferred embodiments, these changes to the alignment icon 200 for a particular file are automatically performed in real-time as the alignment state of that particular file changes.

The state table 208 shown in FIG. 2 illustrates how the alignment indications 202, 204 are changed by the client devices 130, 160 in different situations thereby informing the user of different alignment states.

In state 210, there is a single declared hash value common across the group formed by the client devices 130, 160. Since there are only two users in the group in this example, both the first and second declared hashes 118, 120 for these respective users are the same value. For a group having more than two users, the count of unique declared hash values across the group is one in state 210. That is, all declared hash values 118, 120 are the same value. The declared hashes 118, 120 are formed by running a same hash function on the content of the first and second declared files 122, 124. Thus, regardless of differences in filenames and locations of the declared files 122, 124 on the different client devices 130, 160, when the declared hashes 118, 120 are the same value, this means that the content of both the first and second declared files 122, 124 are also the same. In other words, the declared files 122, 124 are in alignment across the group of client devices 130, 160. To pass this group alignment information to the user, the group alignment indication 202 is white in state 210.

Likewise, also in state 210, from the point of view of a particular client device 130, 160 on which the alignment icon 200 is being displayed, the working hash 118, 120 equals the declared hash 150, 180. For example, assuming that the icon 200 is being displayed on the first client device 130, state 210 can only occur when the first declared hash 118 matches the first working hash 150. Since the declared and working hashes 118, 150 were formed by running the same hash function respectively on the content of the first declared file 122 and the first working file 154, when the declared and working hashes 118, 150 are the same value, this means that the content of both the declared and working files 122, 154 are also the same. In other words, the user's working file 154 is aligned with the user's declared file 122. To pass this local alignment information to the user, the local alignment indication 204 is also white in state 210.

In state 212, there is more than one declared hash value across the group of client devices 130, 160. Since there are only two client devices 130, 160 in this example, this means that the first declared hash 118 does not match the second declared hash 120. As mentioned previously, since the declared hashes 118, 120 were calculated by running a same hash function on the content of the first and second declared files 122, 124, it follows that the content of these two files must have at least one difference in state 212. In other words, the declared files 122, 124 are not in alignment across the group of client devices 130, 160. To pass this group alignment information to the user, the group alignment indication 202 is black in state 212. Concerning the local alignment indication 204, it is still white in state 212 for the same reason previously described in state 210, namely, on a particular one of the client devices 130, 160 where the icon 200 is being displayed, the content of the user's working file 154, 184, is the same as the content of the same user's declared file 122, 124.

In state 214, the group alignment icon 202 is white for the same reason previously described for state 210, namely, the content of the group's declared files 122, 124 is the same. However, the local alignment indication 204 has now changed to black because a client device's 130, 160 declared hash value 118, 120 does not match that client device's 130, 160 working hash value 150, 180. For example, again assuming that the icon 200 is being displayed on the first client device 130, state 214 will occur whenever the content of the first working file 154 does not match the first declared file 122. Because the content of these files 154, 122 is different, the hash function will return different values for the first declared hash 118 and the first working hash 150. In other words, the user's working file 154 is no longer aligned with the user's declared file 122. To pass this local alignment information to the user, the local alignment indication 204 changes to black in state 214.

In state 216, the group alignment icon 202 is black for the same reason previously described for state 212, namely, the content of at least one of the group's declared files 122, 124 is different than the others. This means there will be more than one unique declared hash value 118, 120 for the group stored in the central database 112. Likewise, in state 216, the local alignment icon 214 is black for the same reason previously described for state 214, namely, the content of a particular user's working file 154, 184 no longer matches the content of the same user's declared file 122, 124.

Figure 3:
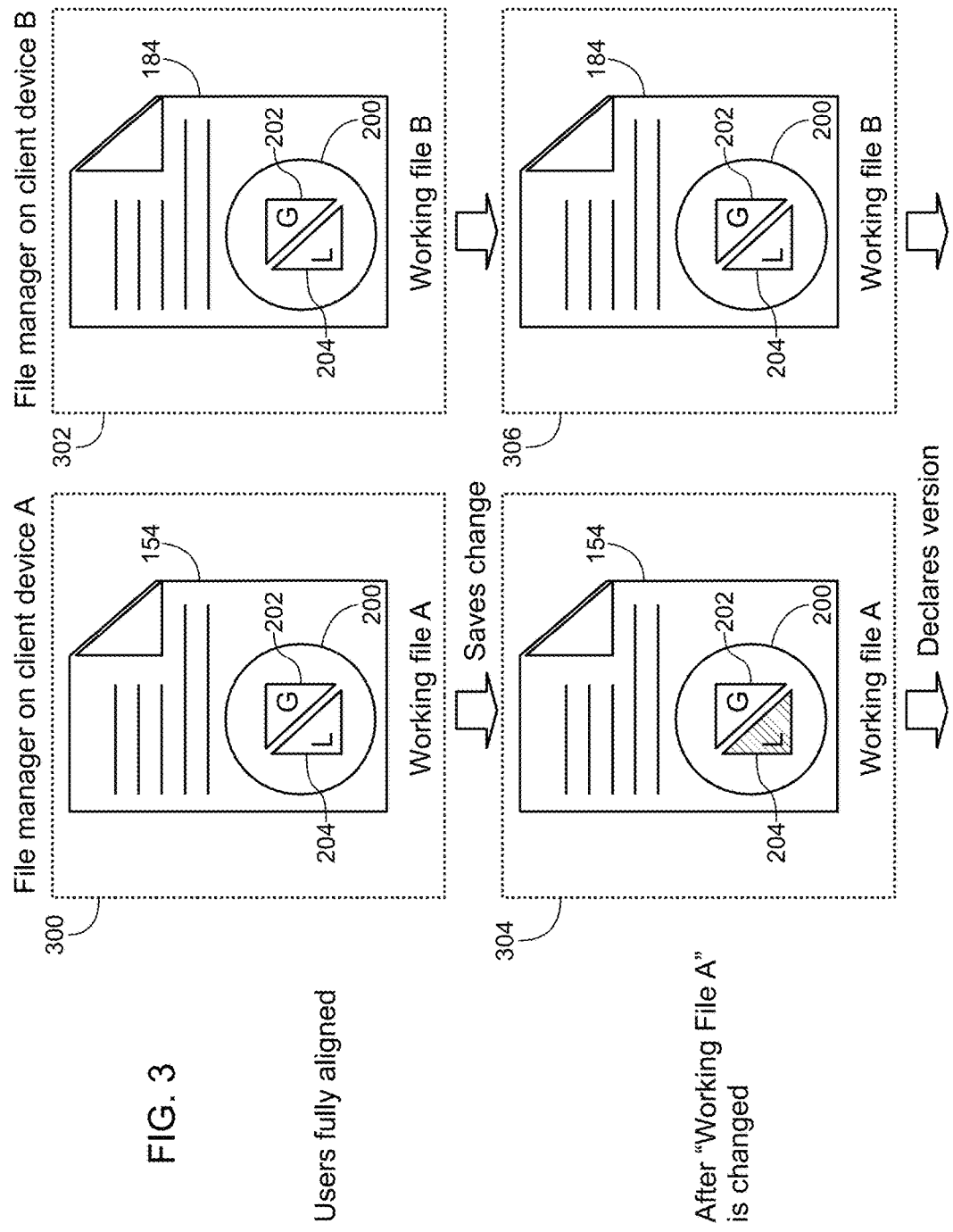
FIG. 3 and FIG. 4 in combination illustrate an example use case scenario of the alignment icon of FIG. 2 showing different group and local alignment indications as a group of users work on a common project or other task.
Figure 4:
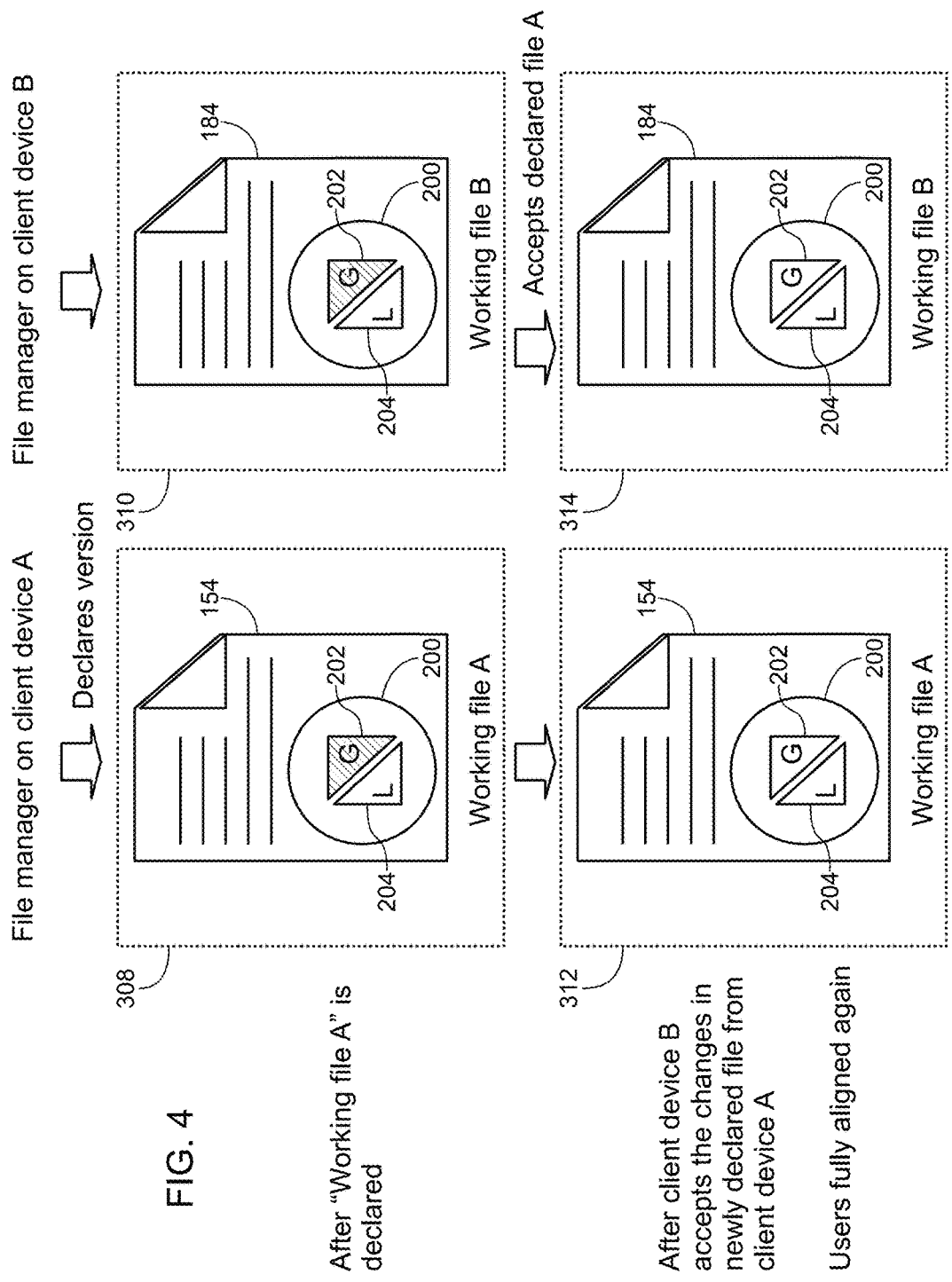

FIG. 3 and FIG. 4 in combination illustrate an example use case scenario of the alignment icon 200 showing different group and local alignment indications 202, 204 as a group of users work on a common project or other task. In this example, the group of users includes two users, namely, a first user operating the first client device 130 and a second user operating the second client device 160.

The example starts on the top row of FIG. 3 with the two users fully in alignment. A file manager screen 300 displayed by the user interface 134 of the first client device 130 shows the alignment icon 200 overlaid on a document icon representation of the first working file 154. The alignment icon 200 on screen 300 firstly has a white group alignment indication 202 because the first declared hash 118 and the second declared hash 120 have the same value. This indicates that the content of the first declared file 122 matches the content of the second declared file 124. The alignment icon 200 secondly has a white local alignment indication 204 because the first working hash 150 and the first declared hash 118 have the same value. This indicates that the content of the first working file 154 matches the content of the first declared file 122.

Also on the top row of FIG. 3, a file manager screen 302 displayed by the user interface 164 of the second client device 160 shows the alignment icon 200 overlaid on a document icon representation of the second working file 154. The alignment icon 200 on screen 302 similarly has a white group alignment indication 202 indicating that the content of the first declared file 122 matches the second declared file 124 (same reason as described above for screen 300), and has a white local alignment indication 204 indicating that the content of the second working file 184 matches the content of the second declared file 124 (known to the second client device 160 because the second working hash 180 and the second declared hash 120 have the same value).

In this example, the user of the first client device 130 opens the first working file 154 and makes a change to the content. The change may be minor such as correcting a typographical error in the document or major such as adding or deleting a large section of text. After the change is saved, the example proceeds to the bottom row of FIG. 3 where the first client device 130 automatically recalculates the first working hash value 150 and then changes the alignment icon 200 displayed on the file manager screen 304. In particular, on file manager screen 304, the local alignment indication 204 overlaid on the first working file 154 is automatically changed to black because the first working hash 154 no longer has the same value as the first declared hash 118. This represents that the content of the first working file 154 no longer matches the content of the first declared file 122. The user of the first client device 130 is thereby made aware of the fact that when they look at the content of their working file 154, they are no longer looking at the same content they have declared to the group (i.e., the content of the first declared file 122).

No changes to the alignment icon 200 are made on file manager screen 306 displayed by the second client device 160 on the bottom row of FIG. 3. The user of the second client device 160 is still in group alignment because the first and second declared hashes 118, 120 are the same value at this point in time. This represents that the content of the first declared file 122 matches the content of the second declared file 124. The user of the second client device 160 is also still in local alignment because the second working hash 180 and the second declared hash 120 are the same value. This represents that the content of the second working file 184 matches the content of the second declared file 124.

As previously mentioned, the first client device 130 changed the alignment icon 200 on file manager screen 300 to as shown in screen 304 because the user made a change to the content of the first working file 154. After the first working file 154 is changed, the first working file 154 is locally out of alignment with the first declared file 122 on the first client device 130. Since the first declared file 122 is stored in the repository 142 on the first client device 130, the user of the first client device 130 may elect to revert back to their declared version (i.e., revert the content of the first working file 154 back so that it matches the content of the first declared file 122); however, in this example, the user of the first client device 130 decides to declare the first working file 154 as their new declared version to the group. This may be done by the user right-clicking on the document icon of first working file 154 in file manager screen 304 in order to enter a context menu. The context menu includes a menu option such as "Declare this file as my new version to the group." Other operating systems have other conventions for accessing context-like menu systems such as two finger tap on using mouse pad on a Mac®.

After selecting to declare the first working file 154 to the group, the first client device 130 saves a copy of the first working file 154 in the repository 142 as the newly declared file 122. In this embodiment, previously declared files 122 are still kept in the repository 142 so that the user can always revert back to one of the older versions. The first client device 130 then recalculates the first declared hash value 118 and sends this hash value 118 to the computer server 104 via the Internet 102. The server 104 compares the newly received first declared hash value 118 with the hash value(s) previously declared by the other members in the group. Since there are only two members in the group in this example, the computer server 104 determines that there are now two unique declared hash values, namely, first declared hash 118 and second declared hash 120 being different values. The computer server 104 thereby sends a message with updated group alignment status to both the first client 130, 160. To show what happens on the user interfaces 134, 164 after the client devices 130, 160 receive the updated group alignment status, the example proceeds to the top row of FIG. 4.

On the top row of FIG. 4, two changes are made the alignment icon 200 displayed on the first client device 130. Comparing between file manager screen 304 shown on FIG. 3 and file manager screen 308 shown on FIG. 4, both the group alignment indication 202 and the local alignment indication 204 have toggled states. The group alignment indication 202 on file manager screen 308 is now black because the first declared hash 118 no longer matches the value of the second declared hash 120. This indicates to the user of the first client device 130 that the group of users have at least one difference in the content of their declared files 122, 124. Furthermore, the local alignment indication 204 on file manager screen 308 is now white because part of the declaration process involved copying the new content of the first working file 154 over to the first declared file 122. This means that first working hash 118 and the first declared hash 150 now have the same value since both these hashes 118, 150 are calculated by running the same hash function on the same content respectively stored in the first working file 154 and first declared file 122.

Concerning the second client device 160, only one change is made to the alignment icon 200 displayed on file manager screen 310. In particular, the group alignment indication 202 on file manager screen 310 is now black because the first declared hash 118 no longer matches the value of the second declared hash 120. The user of the second client device 160 is thus also made aware that the group of users have at least one difference in the content of their declared files 122, 124. However, because the second working file 184 and the second declared file 124 still have the same content (and same calculated hash values 180, 120) the local alignment indication 204 on file manager screen 310 still stays white on the second client device 160.

To bring the group of users back into alignment, the user of the second client device 160 in this example accepts the content of the first declared file 122. This may be done by the user of the of the second client device 160 right-clicking on the document icon of second working file 154 in file manager screen 310 in order to enter the context menu and select a menu option such as "Compare." In response, the second client device 160 then displays a list of the users in the group and indicates which users have different declared hash values 118, 120. In this example, the list will show that the user of the first client device 130 has a different hash value (i.e., the first declared hash 118 associated with the first client device 130 is different than the second declared hash 120 associated with the second client device 160). The compare list may include other metadata such as time of change, status and comments as entered by the user of the first client device 130 when declaring the new first declared hash 118, filename and location of file in the user files 144 on the first client device 130, etc. Especially if the group includes more than two users, the compare menu helps any particular user quickly ascertain why the group alignment indication 202 is black (indicating out of group alignment).

In this example, the user of the first client device 130 is assumed to have shared a copy of the first declared file 130 with the user of the second client device 160. This may be done automatically as a part of system 100 where the first declared file 122 is uploaded from the first client device 130 and stored in the repository 114 of the computer server 104 as centrally stored declared file version 125 for downloading by any other user in the group. Alternatively, the first declared file 122 may be sent to the user of the second client device 160 by any desired manner. For example, some users may prefer passing files by email and the user of the second client device 160 may simply receive the new first declared file 118 with the changes in an email message from the user of the first client device 160. In yet another example, the user of the second client device 160 may manually make the same changes to the second working file 184 as were made to the first working file 154. For instance, the user of the first client device 130 may verbally describe the changes in a telephone call to the user of the second client device 160. Other methods may be used such as mailing or shipping via courier.

Regardless of how the user of the second client device 160 receives the updated content of the first declared file 122, the content of the second working file 124 in this example now matches the first declared file 122. The user of the second client device 160 then declares the second working file 184 to the group. This involves the second client device 160 calculating a new second working hash 180 and second declared hash 120 and both these hashes 180, 120 now have the same value. The second client device 160 sends at least the second declared hash value 120 up to the computer server 104, and the computer server 104 then sends messages back down to the two client devices 130, 160 with updated group alignment status indicating that both the first and second declared hash values 118, 120 stored at the central server 104 are again the same value. The example then proceeds to the bottom row of FIG. 4.

As shown on the bottom row of FIG. 4, both the file manager screens 312 and 314 respectively displayed on the first and second client devices 130, 160 have the same alignment icon 200. In particular, the file alignment icons 200 on screens 312, 314 both have white group alignment indications 202 indicating both the first and second declared files 118, 120 have the same content. The file alignment icons 200 on screens 312, 314 also both have white local alignment indications 202 indicating that the user's working files 154, 184 and declared files 122, 124 also have the same content on each respective client machine 130, 160. The users of the group are back into full group and local alignment.

Figure 5:
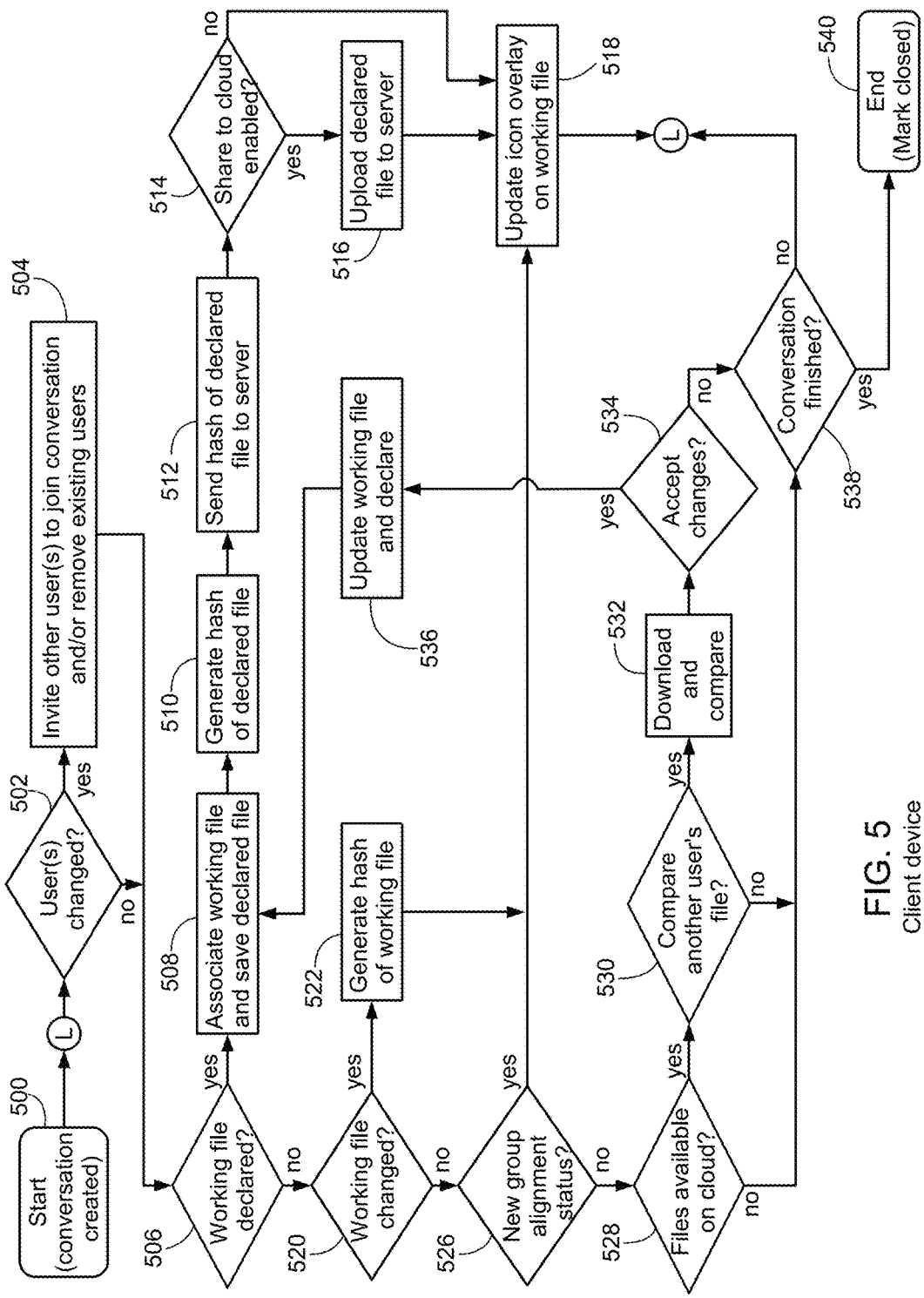
FIG. 5 illustrates a flowchart of operations performed by a client device providing alignment information to a user according to an exemplary embodiment of the invention.

FIG. 5 illustrates a flowchart of operations performed by a client device 130, 160 providing alignment information to a user according to an exemplary embodiment of the invention. The steps of FIG. 5 may be performed by the processors 132, 162 of a client device 130, 160 executing software 146, 176 loaded from a memory such as storage device 138, 168. The software may comprise a local client installation of a version control software application working as described in the following. The software may also be run by the client device 130 without being locally installed. For example, the software may be run fully with user permissions and not require administer installation. The steps of the flowchart in FIG. 5 are not restricted to the exact order shown, and, in other configurations, shown steps may be omitted or other intermediate steps added. To simplify the explanation, the flowchart is described in the following from the point of view of the first client device 130; however, it is to be understood that each client device 130, 160 in a particular group of users may perform the following operations in a similar manner. In this embodiment, the first client device 130 performs the following operations:

The process begins at step 500, when the user of the client device 130 starts a new conversation. A conversation in the context of this embodiment is a way to refer to a common project or task being worked on by one or more users. A conversation may be thought of as a unifying entity of communication (UEC) to which any one or more participants such as users or other agents may be associated. The participant may be a person, but could also represent any entity which could participate such as a company, organization, department, or possibly even a condition of state such as a production release, test release, etc. The element which identifies the participating entity may be a user_id representing the participating user. For instance, the user of the first client device 130 may right-click on a budget related user file 144 in order to enter the context menu, select a "Create new conversation" menu item, and thereby create a new conversation to work on a corporate budget report. The conversation is assigned a globally unique conversation identifier and this conversation identifier is passed from the first client device 130 to the computer server 104 or vice versa depending on which of the two devices 104, 130 generates and assigns the conversation identifier. In some embodiments, the client device 130 initiates the new conversation creation but the conversation identifier is assigned by the central server 104 in order to make sure it is globally unique across the system 100. Other metadata such as a title of the conversation, purpose, due date, etc. may be inputted by the user and passed by the client device 130 to the computer server 104 at this step as well.

The system 100 may support any number of simultaneous and independent conversations. Conversations may also be linked to one another such as when one project contains several subparts. Each participant involved in a particular conversation may associate zero or more documents with the conversation at any point in time. Associating a document with a conversation does not necessarily imply sharing of the content that document with other users in the conversation, and further does not necessarily imply or require agreement with any opinions contained within the content by other users. Conversely, not sharing a document does not imply that another participant in the conversation does not already have that document by some other means.

At step 502, the user of the client device 130 may add or remove other users from the conversation. For example, the user of the first client device 130 may invite the user of the second client device 160 to join the conversation. Different users may be identified by unique attributes such as user_id, email addresses, first/last names, employee numbers, phone extensions, IP or other network addresses, etc. In this embodiment, each different user is assigned a unique user identifier within system 100 and any number of different user identifiers (i.e., different users) may be associated with a particular conversation identifier. At step 502, the user may also remove users from the conversation if desired. For example, the user who creates a particular conversation may by default be designated an administrator of that conversation and be authorized to add and remove any users to/from that particular conversation. If the users associated with the conversation are modified, control proceeds to step 504; otherwise, control proceeds to step 506.

At step 504, the user and/or the first client device 130 invites the other user(s) to the conversation. This may be done centrally by passing a user invite message from the first client device 130 to the server 104 causing the server 104 to send invite emails to the other users (see step 604 of FIG. 6). Alternatively, the first client device 130 may automatically sends out the invite emails. The user of the first client device 130 may manually send emails or otherwise contact conversation participates and other users to invite them to the conversation. Users may also be removed from the conversation at this step by sending a message to the computer server 104 in order to un-associate certain user identifiers from the conversation identifier in the central database 112.

At step 506, the client device 130 checks whether the user has newly declared a working file 154. In this embodiment, the user may declare any file located anywhere in the user files 144 accessible to the client device 130. For instance, the user may create a new document or other file and then declare it, or may select an existing document or other file to declare. Further, a user may select their existing working file 154 that was previously declared but has since been changed and then re-declare it.

The actual mechanism allowing the user to declare a file may be any suitable functionality of the user interface 134. For instance, after selecting a file in a file manager running on the client device 130, the user may right-click in order to enter the context menu and select a "Declare this file as my new version to the group." Other mechanisms may be employed as well such as a "Declare" button within a top or side menu bar of a word processor or other document creation tool such as Excel®, Word® or Google Docs® for example. When the user declares a file, the file is designated as the user's working file 154 and control proceeds to step 508 to copy the content of the user's working file 154 to thereby form the user's declared file 122. If the user does not declare a file, control proceeds to step 520 to check for changes in the current working file 154 (if any).

At step 508, the client device 130 saves a copy of the user's declared file 122 according to the content of the user's newly declared working file 154. In this embodiment, the client device 130 copies the working file 154 (newly declared at step 506) into the local repository 142 on the client device 130 to thereby form a copy of the declared file 122. In this way, the content of the declared file 122 is the same as the working file 154 at the time the working file 154 was declared.

Another part of step 508 involves saving a copy of a previous version of the user's declared file 122 in a history stored in the local repository 142 thereby allowing the user to always be able to undo their changes and/or view the content of their previously declared file(s) 122.

Yet another part of step 508 involves associating the newly declared working file 154 with the conversation. In some embodiments, this is done by the client device 130 adding the conversation identifier and possibly other relevant data to an alternate data stream (ADS) or similar file structure associated with the working file 154. For instance, an example of ADS data for a particular working file 154 on a Windows® based client device 130 is as follows:
{
  "a1be185b5bd1b14e57b8670d802fe25919308497": [
    "0390fe760e2b10de06f0350818b8cce97960680d",
    "9f7890212b6fc2a102848a2a8595f3904bad1025"
  ]
}
where the format is:
{
  "HASH OF REPO ID1": ["CONVERSATION ID X", "HASH OF LAST FILE LOCATION"]
  ,"HASH OF REPO ID2": ["CONVERSATION ID Y", "HASH OF LAST FILE LOCATION"]
  , . . . .
}

In this example, the REPO ID1 is a repository identifier for the first repository 142 on the first client device 130, and REPO ID2 is a repository identifier for the second repository 172 on the second client device 160. These repository identifiers (REPO ID1, REPO ID2) are globally unique across system 100 and act similar to client identifiers in that they identify the particular client device 130, 160 with which the repository is associated. Since working files 154, 184 may in some situations be stored on locations accessible to multiple client devices 130, 160 (such as network shares), and since working files 154, 184 may be copied from client device 130, 160 to another in a way that causes the ADS to also be copied along with the file contents (such as when copied onto a universal serial bus (USB) hard disk), a hash of the repository identifier is stored along with the conversation identifier in the ADS.

In order to determine whether a particular file is associated with the first client device 130, the first client device 130 generates a hash of its own repository identifier and then checks the ADS of the particular file (if it exists) in order to see if there is a conversation identifier stored in the ADS associated with that hashed repository identifier. Storing the hash of the repository identifier in the ADS rather than the repository identifier in this embodiment is beneficial to make it harder for a malicious user to determine the repository identifiers; however, in other embodiments the repository identifier itself can be directly stored in the ADS.

As shown in the above ADS example, the ADS for a particular file can also contain associations to different conversation identifiers for different repository identifiers. For instance, the above file is associated with CONVERSATION ID X on the first client device 130 (REPO ID1) but is associated with CONVERSATION ID Y on the second client device 160 (REPO ID2). Allowing multiple REPO and CONVERSATION identifier pairs to be stored in the ADS allows the same file to be recognized as being associated with different conversations on different client devices 130, 160 even though the actual file is the same.

In other embodiments, rather than repository identifiers (REPO ID 1, REPO ID2), user identifiers may be stored in the ADS instead. A benefit of such embodiments is that a particular user may have multiple client devices 130, 160 that the particular user utilizes. For example, a laptop, desktop, netbook, home and work machines, etc. Even as the user moves their files around between these machines, each machine would still recognize that the user identifier (or hash of the user identifier) stored in the ADS of a file matches the user identifier in the local database 140, 170. It should also be noted that because the ADS technique described above also allows multiple users to work on the same file, either in the same conversation or in different conversations. For instance, two or more users may be having a conversation regarding the same document stored on a network share accessible to both users. The alignment icon 200 displayed to each user may be different but the file content is the same to both users at all times because it is the exact same file.

Another piece of information that is stored in the ADS in this example is a hash of the last file location. This is beneficial to store in the ADS in some embodiments to allow the client device to later determine that the file has moved to a different location (and/or been renamed to a different name). For instance, when examining a particular file, the client device may find that the hash of the file's current location no longer matches the hash of its previous location as stored in the ADS. Upon determining a file has been moved, the local database 140 may be updated to record the file's new location and/or to check whether the old file still exists. In one example, certain information may be stored in the local database 140, 170 or the local repository 142, 172 based on a hash of the file's full path and filename. After the file has been moved to a new location (or renamed) the current hash of the file's full path and filename will no longer match the old one. However, because the old hash is stored in the ADS, the client device 130, 160 can still lookup the information based on the old hash value as the key value.

If necessary, the information may be moved or copied in the database 140, 170 or repository 142, 172 to use the new location hash as the key value.

Although the above examples have all focused on storing the conversation identifier in the ADS of the newly declared working file 154, other ways of associating a file with a particular conversation identifier are also possible. For instance, on Linux® machines, extended file attributes can be utilized to store information associated with a file in a similar manner to the ADS on a Windows® machine. Likewise, on a Macintosh® machine, resource forks can be utilized to store information associated with a file in a similar manner to the ADS on a Windows® machine. Both extended attributes and resource forks can be utilized instead of the ADS in other embodiments. For instance, each client device 130, 160 may store the above conversation identifier, and/or other identifiers (e.g., repository, client, user, etc.), and/or other information (file's last location), or hashes of said identifiers and information, in either the ADS, extended attributes, or resource fork depending on whether the client device 130, 160 is a Windows®, Linux®, or Mac®.

Some file systems types such as FAT32 do not support any of ADS, extended attributes, or resource fork. A client device 130, 160 storing a working file 154, 184 on such a file system may employ other techniques to associate the file with a particular conversation. For example, a lookup table of filename/location in the local database 140, 170 can map working files 154, 184 with a particular conversation ID. In another example, a small associate file with the same filename and location as the working file 154, 184 but with an alternate extension may be stored to contain the above information. This counterpart file may be hidden if the file system allows hidden files. In yet another example, the counterpart files may be stored elsewhere such as within the local repository 142, 172 and may be named as the hash of the current location of the working file 154, 184. When a newly declared working file 154, 184 is declared, at step 508 the client device 130, 184 automatically generates a hash of the working file's 154 full path and filename and then stores a small counterpart file in predetermined location. The counterpart file has a filename according to the hash of the full and filename of the working file 154, 174 and has the above-described ADS content. Thereafter, the client device 130, 160 can always determine if a particular file is associated with a conversation by generating a hash of the particular file's full path and filename and then looking up in the predetermined location to see if there is a counterpart file having a filename matching that hash value. If yes, the conversation identifier will be stored inside.

Continuing the description of the flowchart of FIG. 5, at step 510 the client device 130 generates the declared hash 118. This is done by the client device 130 running a hash function such as the well-known SHA1 or MD5 digest hash algorithms on the content of the user's declared file 122. In this way, the declared hash 118 is a summation or condensation of the content of that file 122. The resulting hash value is stored in the local database 140 as the declared hash 118. Since the content of the working file 154 is the same as the content of the declared file 122 at this point in time, the hash values of these two files 150, 120 are the same, and the declared hash value 118 is also saved as the working hash value 150 in the local database 140.

At step 512, the client device 130 sends the declared hash value 118 to the computer server via the Internet 102.

At step 514, the client device 130 checks whether cloud sharing for the declared file 122 is enabled. In this embodiment, each time a user declares a working file 154 (at step 506), the user may also select whether to share a copy of the content of the working file 154 with one or more other users of the group via the server 104.

For instance, after a user decides to declare a working file or folder at step 506, the user may be presented with a dialog box allowing the user to select and input certain details about the file such as comments, status, user selections, etc. One of the input fields of the declare process may be whether the user wishes to "Share" the declared file/folder with other users via the cloud-based computer server 104. In another configuration, the context menu of a folder or file in the file manager running on a client device 130, 160 may include two separate menu items: "Declare" and "Share". The "Declare" option will only send the declared hash (or set of declared hashes) to the server 104 while the "Share" option with both send the declared hash(es) and also upload a copy of the declared file/folder to the computer server 104.

If the user has selected to share the content of the declared file 122, control proceeds from step 514 to step 516 to upload the declared file 122 to the computer server 104. Alternatively, if the user did not select to share the content, step 516 is skipped and control proceeds directly to step 518 to update the alignment icon 200 overlay on the working file 154.

At step 516, the client device 130 uploads a copy of the declared file 122 to the computer server 104. In addition to uploading an exact copy, the declared file 122 may be compressed and optionally encrypted prior to upload. A specific encryption and upload process according to an exemplary embodiment of the invention is described in more detail later with regard to FIG. 11.

At step 518, the client device 130 updates the alignment icon 200 overlaid on the user's working 154.

In this embodiment, the group alignment indication 202 is white when all the declared hash values 118, 120 from the various users in the conversation are the same. The computer server 104 keeps track of the count of unique declared hash values 118, 120 and passes this down to the client device 130 (at step 526) when a change in the declared hash count occurs. When there is more than one declared hash value 118, 120, meaning that at least one user's declared hash value 118, 120 is different, the group alignment indication 202 is black in this embodiment.

The local alignment indication 204 in this embodiment is white when overlaid on a working file 154 for which the working hash value 150 that file 154 is the same as the declared hash 118 for that user. When step 518 is reached from a new working file 154 being declared (step 506), the local alignment indication 204 will be switched to white on this working file 154 because the content of the declared file 122 is simply a copy of the content of the newly declared working file 154. Alternatively, when step 518 is reached from the user saving a change to the working file 154 (the "yes" branch of step 520) the local alignment indication 204 will be switched to black. This indicates the content of user's working file 154 no longer matches what the user has earlier declared to the group.

See previously described FIGS. 2-4 for examples of how the alignment icon 200 is updated to show different colours at step 518 based on different alignment states.

Figure 9:
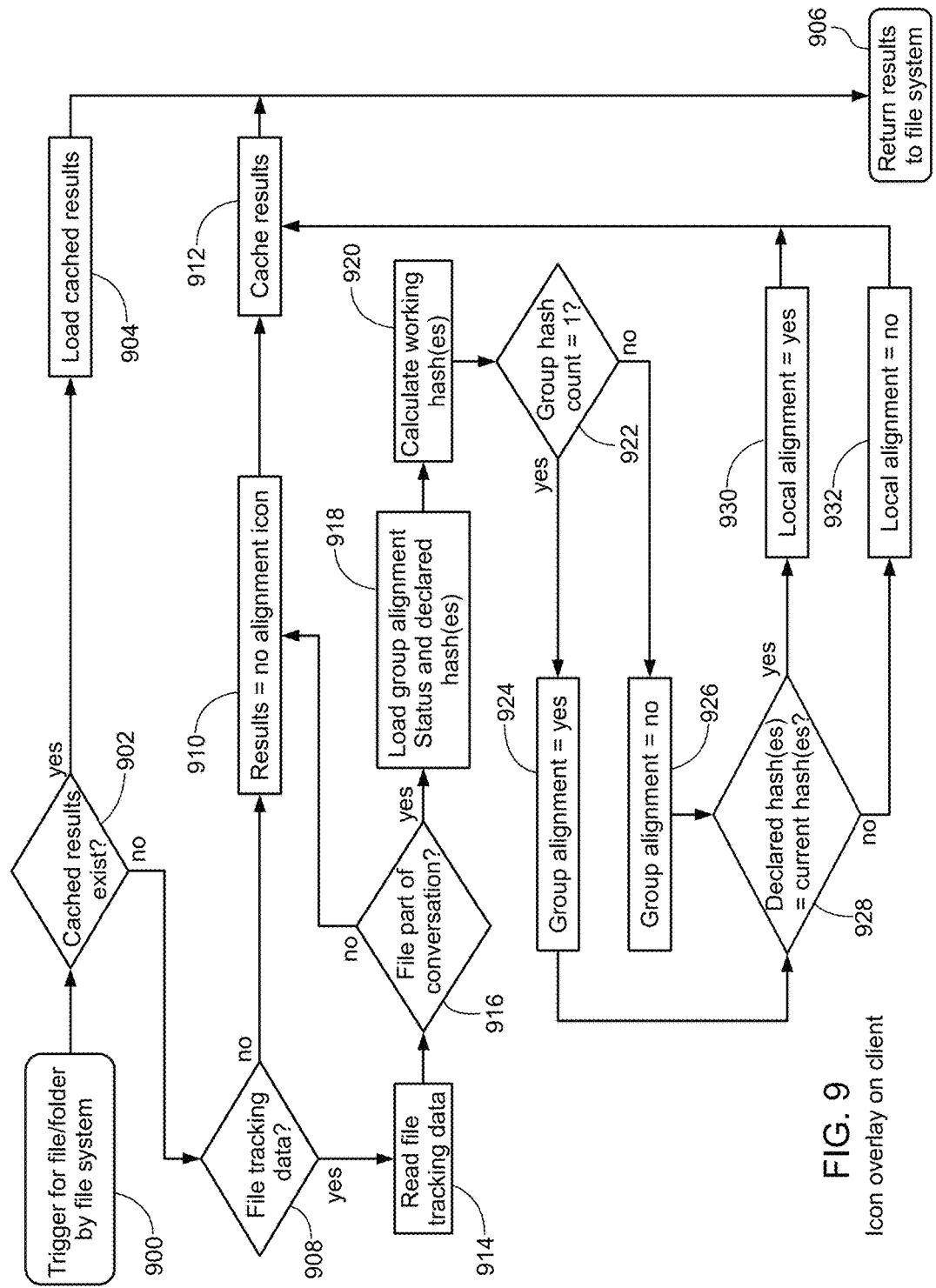
FIG. 9 is a flowchart of steps in an icon overlay process to display the alignment icon of FIG. 2 on files and folders according to an exemplary embodiment.

Also at step 518, the client device 130, 160 may iterate through a plurality of user files 144 in order overlay an alignment icon 200 on each of the different files. Generally speaking, the group alignment indication 202 for all files in a particular conversation will be the same. However, the local alignment indication 204 can be different on different user files 144 because it depends on whether the content of a particular working file 154 matches the content of the user's declared file 122. It is possible that a user may have a plurality of copies of working files 154 that do match the declared file 122, and another plurality of different working files 154 that do not match the declared file 122. FIG. 9, described later, shows a more detailed icon overlay process that may be performed by the client device 130 whenever a program such as a file manager running on the client device 130 needs to display or update the display of a folder of one or more files.

After the icon overlay process at step 518 is complete (for either one or a plurality of files associated with the conversation), control returns to step 502. The node labelled "L" in FIG. 5 indicates a jump back to a start of a loop beginning at step 502. See the corresponding node "L" intermediate steps 500 and 502.

At step 520, the client device 130 checks whether the user has saved a change to the user's working file 154. In this embodiment, the user's working file 154 is the file that the user most recently declared at step 506. There may also be other user files 144 that are associated with the conversation and a similar process as described herein may be applied to these other files to update their local alignment indications 204 even though they are not the most recently working file 154. When the user saves a change to the content of a file associated with the conversation such by saving a change to the user's most recently declared working file 154, control proceeds to step 522. Otherwise, control proceeds to step 526 to check to see if new group alignment status is being sent from the server 104.

At step 522, the client device 130 calculates the working hash value 150 for the file that was changed at step 520. Assuming that the changed file is working file 154, the client device runs the hash function on the new content of working file 154 in order to generate the working hash 150, which is saved in the local database 140 in this embodiment. Other metadata may also be saved at the same time such as a timestamp of when the working hash 150 was calculated. In this way, the working hash only needs to be recalculated if the modification timestamp of the working file 154 is more recent than the time the saved working hash 150 was calculated as specified in the database 140. Other metadata such as the full path of the working file 154 may also be stored in the local database 140 and passed to the server 104. After calculating the working hash 522, the process then proceeds to step 518 to update the icon overlay on the working file 154 depending on whether the working hash 150 matches or is different than the declared hash 118.

At step 526, the client device 130 checks whether a message with new group alignment status has been received from the computer server 104. If yes, control proceeds to step 518 to update the group alignment indication 204 associated with the conversation according to the new group alignment status. In this embodiment, the group alignment indication 204 is displayed when the working file 154 and any other user files 144 associated with the conversation are displayed in the file manager running on the client device 130.

At step 528, the client device 130 checks whether other user's declared files are available for download from the computer server 104. As previously mentioned, when a user declares a file (at step 506) they may specify a configuration option for cloud sharing that will cause an optionally compressed and encrypted copy of the newly declared file 124 to be uploaded to the server 104, shown as central versions 123, 125 in FIG. 1. The computer server 104 may send down information to each of the client devices 130, 160 in the conversation indicating whether centrally stored file versions 123, 125 from one or more users in the conversation are available for download, for example see the first column of FIG. 19 showing an accessibility icon. When there is at least one centrally stored file versions 123, 125 in the group available for download, control proceeds to step 530; otherwise, control proceeds to step 538.

At step 530, the client device 130 checks whether the user wishes to compare or otherwise view the contents of one or more of the centrally stored declared file versions 123, 125 available in the central repository 114 on the server 104. The user may select to compare between any two or more of the centrally stored declared file versions 123, 125 and/or or between declared and working files 122, 154 accessible to the client device 130. In this embodiment, the user selects the file(s) 123, 125 they wish to compare on a dialog box. A download option may also be present to simply download a particular file 123, 125 on the server 104 without doing a comparison with another file on either the client device 130 or the server 104. In response to the user selecting to compare one or more centrally stored files 123, 125 or to download one or more of the centrally stored files 123, 125, control proceeds to step 536; otherwise, control proceeds to step 538.

At step 532, the client device 130 downloads from the computer server 104 the centrally stored declared file version(s) 123, 125 selected by the user at step 530. The contents of the downloaded file(s) 123, 125 may viewed and/or compared with each other, and/or with the content of any of the user's working file 154, the user's declared file 122, or any other user files 144 as selected by the user. Changes between the content of the download file(s) 123, 125 and the user's other file(s) 122, 154, 144 may be shown side by side or with different colors using any known compare tools and mechanisms such as the compare changes (legal blackline) tool available in Word® for text documents or the compare tool available in Imagemagick to show differences between different images.

As previously mentioned, the centrally stored declared file versions 123, 125 stored on the computer server 104 may be compressed and encrypted prior to sending to the server 104 so step 532 may also involve decrypting and uncompressing the downloaded file 123, 125 prior to allowing the user to view its contents and compare the contents with other files on the client device 130. Further explanation of a download and decryption process according to any exemplary embodiment of the invention is described later with respect to FIG. 12.

It should be noted that even if the other users have not elected to share their files through the computer server 104, the metadata may still be shared even though the file content is not shared. As previously mentioned, this metadata may include the full file path and name of the other users declared file(s) and the metadata may be optionally shared with other users in the conversation. This is particularly beneficial when the location of another user's file is on a network share accessible to two or more users in the conversation. In this way, users may store their working files 154 anywhere and may share the location of those files with the other users via the cloud server 104. The other users can download the location metadata from the server and then go find the file at that location. For instance, the context menu may include a "Take me to that folder" button that immediately opens the file manager at the folder specified by the location metadata.

At step 534, the client device 130 determines whether the user wishes to accept the content of the downloaded file 123, 125. The contents of the downloaded file, after decrypting and uncompressing if necessary, may be accepted by the user selecting an "Accept" menu option presented either in a context menu available on the file, a separate compare dialog box, or on the menu bar integrated into a document creation tool such as Word® or Excel®. A user may select whether to automatically accept another user's declared file where part of accepting involve declaring it to the group as the user's new declared file. Likewise, a user may select whether to automatically replace their file with another user's declared version without automatically declaring the new file to the group. Users may also select whether to automatically synchronize with another user in the conversation or with themselves. In this way, whenever the client device 130 receives new group alignment status indicating the other user has declared a new file, the client device 130 will automatically download and accept that new file. When the user elects to accept the content of the downloaded file 123, 125 and declare that acceptance to the group, control proceeds to step 532; otherwise, control proceeds to step 538.

At step 536, the client device 130 updates the working file 154 to match the contents of the file downloaded at step 532. This newly updated working file 154 is then automatically declared and the process returns to step 508 previously described in order to re-calculate the declared hash value 118 (the working hash value 154 is the same at this point) and upload the user's newly declared hash value 118 to the server 104.

At step 538, the client device 130 checks whether the user wishes to finish the conversation. In this embodiment, any user participating in a conversation may elect to drop out of the conversation at any time. Additionally, the primary administrative user who started the conversation at step 500 may also close the conversation in order to remove all existing users. If the conversation is closed, control proceeds to step 540; otherwise, control returns back to step 502 to restart the loop via the "L" node.

At step 540, the client device 130 sends a conversation close message to the computer server 104 in order to end the conversation. The client device 130 further cleans up the local database 140, repository 142, and user files 144 to remove associations with the now closed conversation identifier and to remove unnecessary files and data such as the various hashes associated with the conversation. In this embodiment, each user may elect to keep an archive of the history of a closed conversation, which may be desirable to preserve the various metadata such as comments and status data along with copies of the versions of the declared files at each stage during the conversation.

Other steps may also be added in to the above flowchart of FIG. 5. For instance, a new step may be added intermediate steps 526 and 528. The new step is labelled "Did user check in working file?" and involves the client device 130 determining if the user has selected a "Check in this file" option from the context menu. When "yes" then client device 130 stores a copy of the working file 154 into the local repository without declaring the file to the other users of the conversion. This is beneficial to allow the user to store a backup copy of the working file at any time. The client device 130 may also automatically check-in the working file 154 to the repository 142 and thereby automatically make backups. For example, automatic check-ins may be performed by the client device 130 every X minutes or after modification is made to the working file 154.

FIG. 19 illustrates an example of a conversation explorer window 1500 that may be accessed by a first user (user_id="1") right-clicking over a working file 154 associated with a conversation and selecting the "Compare" menu item. The first column includes an accessibility icon. Examples of different accessibility icons and their meanings are illustrated in FIG. 20. The second column includes a local alignment indication 204 showing how the user's working file 154 aligns with the declared files 124 by each of the users in the conversation, shown on separate rows of the conversation explorer.

Looking at the rows, the first row shows the column headings, and the next row illustrates the details of the user's own most recently declared file. The next rows show details of the other users participating in the conversation. The same colour conventions are utilized as on the alignment icon 200—in particular, black hash lines represent differences with the user's declared file 122 and white represents alignment with the user's declared file 122. If another user has the same file, then their email and document IDs will be shown in white. If not, then they will be displayed with black hash lines. Similarly, the state of alignment of the text entry fields of status and suggested file name is easily visible. These colour values are also show by the local alignment icon 204.

By the first user highlighting any two rows and pressing the "Diff tool" button, a difference comparison tool such as the legal blackline comparison tool in Word® will be opened to show clearly what is different (if anything) between the two files. If only one row is selected and "Diff tool" is pressed, this compares the selected file to the first user's working file 154 is performed.

By the first user selecting a row and pressing the "Accept" button, the selected file is downloaded, replaces the working file 154, and is automatically declared back the participants as the first user's new version. ("yes" branch from step 534 of FIG. 5)

By the first user selecting a row and pressing the "Download only" button, the selected file is downloaded as local copy but not automatically declared back to the participants.

Like the alignment icons 200 show in the file manager, the conversation explorer window 1500 show in FIG. 15 is also updated in real-time by the client device 130 as new group alignment status and/or metadata is received from the server 104 at step 526.

Figure 6:
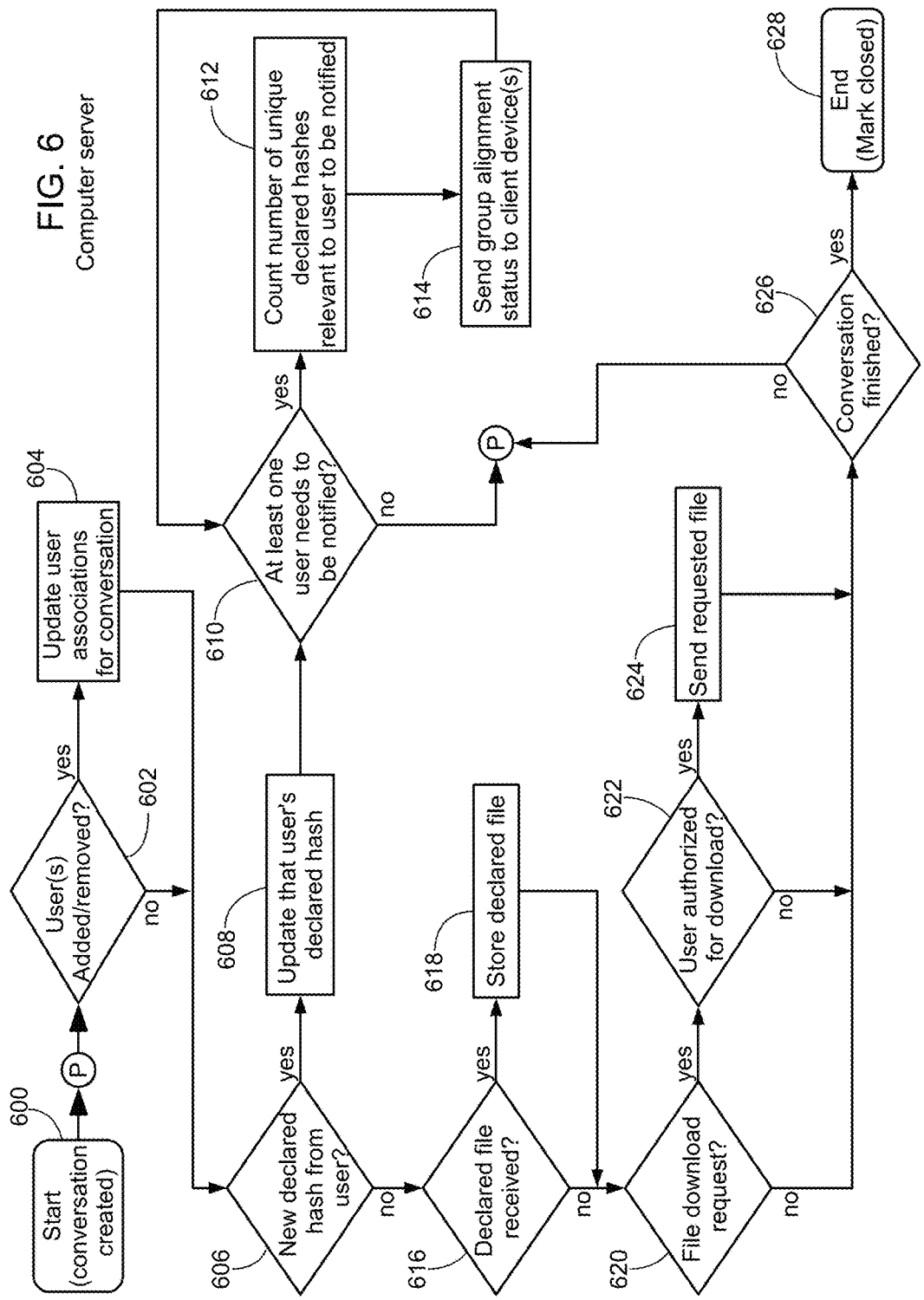
FIG. 6 illustrates a flowchart of operations by a computer server providing group alignment information to a plurality of client devices according to an exemplary embodiment of the invention.

FIG. 6 illustrates a flowchart of operations by a computer server 104 providing group alignment information to a plurality of client devices 130, 160 according to an exemplary embodiment of the invention. The steps of FIG. 6 may be performed by the processors 106 of the computer server 104 executing software 116 loaded from a memory such as storage device 110. The steps of the flowchart in FIG. 6 are not restricted to the exact order shown, and, in other configurations, shown steps may be omitted or other intermediate steps added. In this embodiment, the computer server 104 performs the following operations:

The process begins at step 600 when a conversation is created. This step corresponds to and is the server 104 counterpart to step 500. A client device 130, 160 sends a conversation creation message to the server 104, which is received by the server at step 600. The server 104 creates a new unique conversation identifier and passes it back to the client device 130, 160 that requested the new conversation to be created. The server also stores a record of the conversation identifier and other details such as the initial user association in the central database 112.

At step 602, the server 104 checks whether one or more user adjustment messages have been received from a client device 130, 160 for the conversation. This step corresponds to and is the server 104 counterpart to step 504. A client device 130, 160 sends user adjustment messages either adding or removing other users to the conversation and the server 104 receives those messages. When a user adjustment message is received, control proceeds to step 604; otherwise, control proceeds to step 606.

At step 604, the server 104 updates the user associations for the conversation in the central database 112 according to the user adjustment message(s) received at step 602. Part of this step may involve checking that the client device 130, 160 or user that sent the user adjustment message is authorized to make the adjustment requested. For example, the original creator of a conversation may be automatically authorized to add or remove users to that conversation. Alternatively, the originally user may delegate this authority to other users, or the system may be configured such that all users can add and remove other users to the conversations. These settings may be configurable settings dependent upon the particular conversation and selected by the original creator. At step 604, the server 104 may also send out automatic emails or other notification messages to the affected users either inviting them to join the conversation when they are added or informing them that they have been removed from the conversation when they are removed.

At step 606, the server 104 checks whether it has received a new declared hash value 118, 120 associated with the conversation from one of the client devices 130, 160. This step corresponds to and is the server 104 counterpart to step 512 shown in FIG. 5. When the server 104 receives a newly declared hash value 118, 120 associated with the conversation, control proceeds to step 608; otherwise, control continues to step 616.

At step 608, the server 104 updates the central database 112 to store the newly declared hash value 118, 120 received at step 606. As previously explained for FIG. 5, a particular user such as the user of the first client device 130, for example, may declare any working file 154 as their declared file 120 and a declared hash 118 is calculated by the client device 130 and sent to the server 104 (at step 512). The server 104 therefore updates the first declared hash value 118 for this user in the central database 112.

At step 610, the server 104 determines whether at least one user associated with the conversation needs to be notified of new group alignment status as result of the newly declared hash received at step 606. In some embodiments, all users associated with a particular conversation are notified of group alignment status whenever any one of the users sends a new declared hash 118, 120 to the server 104. In this case, the server 104 simply pulls a list of all the users currently associated with the conversation at step 610 and control will proceed to step 612 as long as there is at least one other user associated with conversation. Both the user from which the newly declared hash was received at step 606 along with all other users in the conversation are notified.

In other embodiments, a plurality of users may be associated with a conversation but they may configure links between themselves depending on whether they wish to declare hash updates or monitor hash updates from other particular users in the group. For instance, FIG. 13 described later shows an example user interface screen 1300 allowing a particular user to configure links to/from other users in the conversation. When different user links are employed within a conversation, the server 104 parses the user links at step 610 in order to determine if at least one of the users associated with the conversation needs to be notified of new group alignment status as a result of the new declared hash received from the specific user at step 606. Whether or not at least one user needs to be notified will depend on the particular user associations and notification links between those users for the conversation. Assuming there is another user that needs to be notified, control proceeds to step 612; otherwise, if no other users need to be notified, control returns via the "P" node back to the restart the loop at step 602.

At step 612, the server 104 counts the number of unique declared hashes in a sub-group of the users of the conversation as relevant to the particular user that needs to be notified as determined at step 610. For example, if all users in the conversation are to be notified of alignment with all other users in the conversation, this step will simply involve the server 104 counting the number of unique declared hashes values 118, 120 for all users across the conversation. If all users have the same declared hash value 118, 120, then the declared hash count will be one. Alternatively, if at least two of the users have different declared hash values 118, 120 then the declared hash count will be greater than one.

In another example, not all users will necessarily need to be notified of group alignment status with respect to all other users. For example, some users may not care whether they are aligned with other users in the conversation. Likewise, some users may not wish to keep other specific users in the conversation aware of whether they are in alignment. To cover these situations, the server 104 at step 612 only counts the number of unique declared hashes in the sub-group for the particular user that needs to be notified. For example, if user A only needs to be informed of alignment with user C and user D of a particular conversation, the server 104 will count the number of unique declared hash values 118, 120 for these three users A, C, D at step 610. This is the case even if the conversation has other associated users such as users E and F. Since user A simply does not need to be notified of alignment with these other users in this example, the server 104 will not look at the declared hash values 118, 120 for users E and F when counting the declared hashes that are relevant to user A at step 612.

At step 614, the server 104 sends a message via the Internet 102 to the client device(s) 130, 160 associated with the conversation that need(s) to be notified as determined at step 610. The message provides group alignment status according to whether all declared hash values 118, 120 in the group of relevant users as counted at step 612 are the same value or not. Step 614 corresponds to and is the server 104 counterpart to step 526 previously described in FIG. 5. Control then returns to step 610 to check if another user of the conversation needs to be notified. Each time through steps 610, 612, 614 the number of unique declared hash values 118, 120 (and the actual declared hashes utilized in the count process) may be different because each user to be notified may have different user links. Thus, different users in a same conversation may receive difference group alignment status messages from the server 104.

Figure 11:
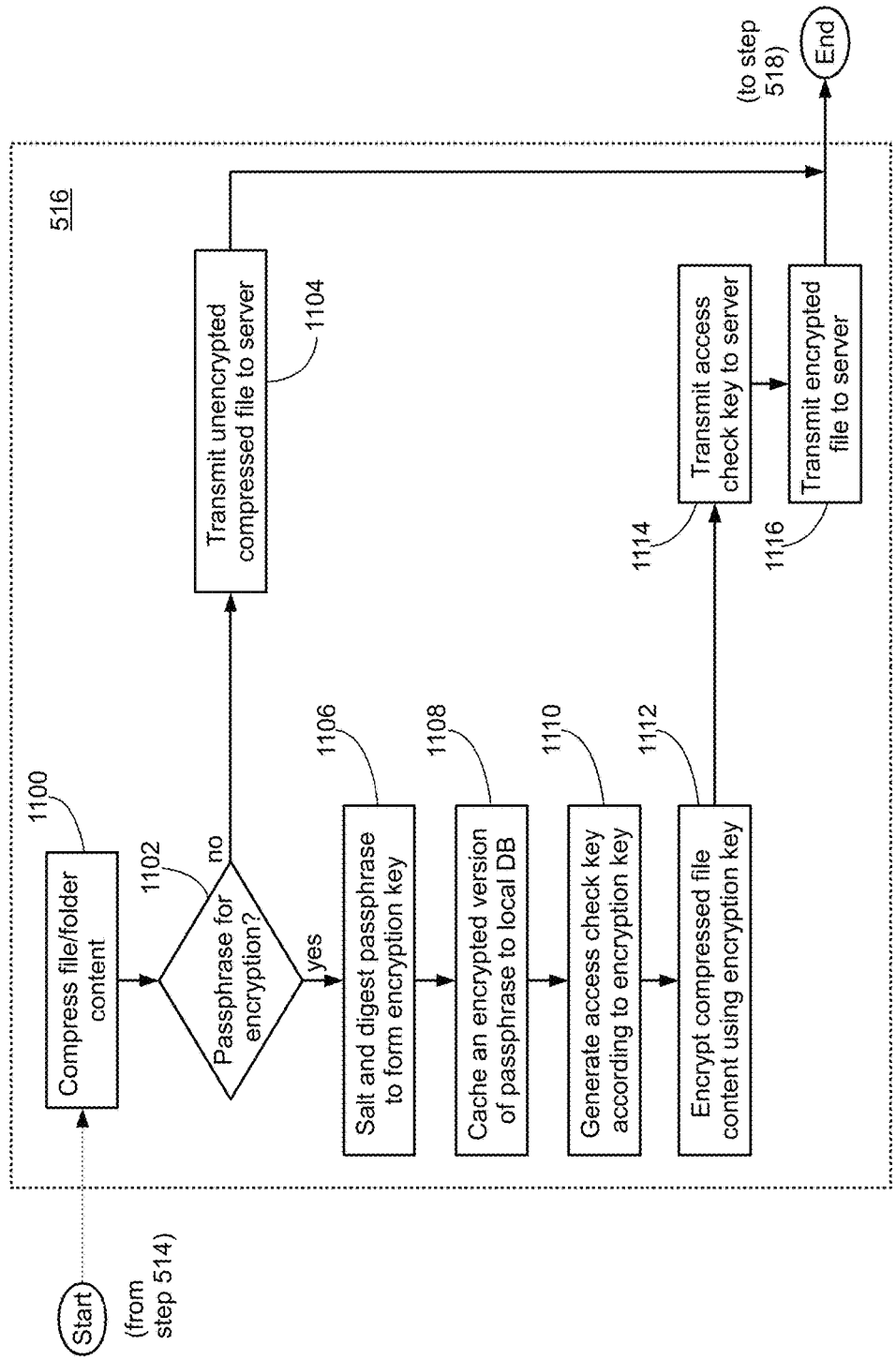
FIG. 11 is a flowchart of steps in an upload process with compression and optional encryption utilized when transferring files from a client device to a computer server according to an exemplary embodiment.

At step 616, the server 104 checks whether it has received a copy of a declared file 122, 124 from one of the client devices 130, 160. This step corresponds to and is the server 104 counterpart to step 516 of FIG. 5. FIG. 11 shows a flowchart of how a client device 130 may compress and optionally encrypt a file for upload to server 104 according to an exemplary embodiment. When a copy of a declared file is received by the server 104, the server 104 proceeds to step 618; otherwise, control continues to step 620.

At step 618, the server 104 stores a copy of the declared file 122, 124 received at step 616 into the central repository 114 as a centrally stored declared file version 123, 125. As previously mentioned, the uploaded file versions 123, 125 received from a client device 130, 160 may actually be compressed and/or encrypted rather than the actual content of the declared file 122, 124 available on the client device 130, 160. An access check key 124, 126 may also be received by the server 104 and be stored along with the centrally stored declared file version 123, 125. Further details of an upload process according to an exemplary embodiment is described in more details with regard to FIG. 11.

At step 620, the server 104 checks whether it has received a request from one of the client devices 130, 160 to download one of the centrally stored file versions 123, 125 in the central repository 114. This step corresponds to and is the server 104 counterpart to step 532 previously described for FIG. 5. When a file download request is received by the server 104 at step 620, control proceeds to step 622; otherwise, control proceeds to step 626.

Figure 12:
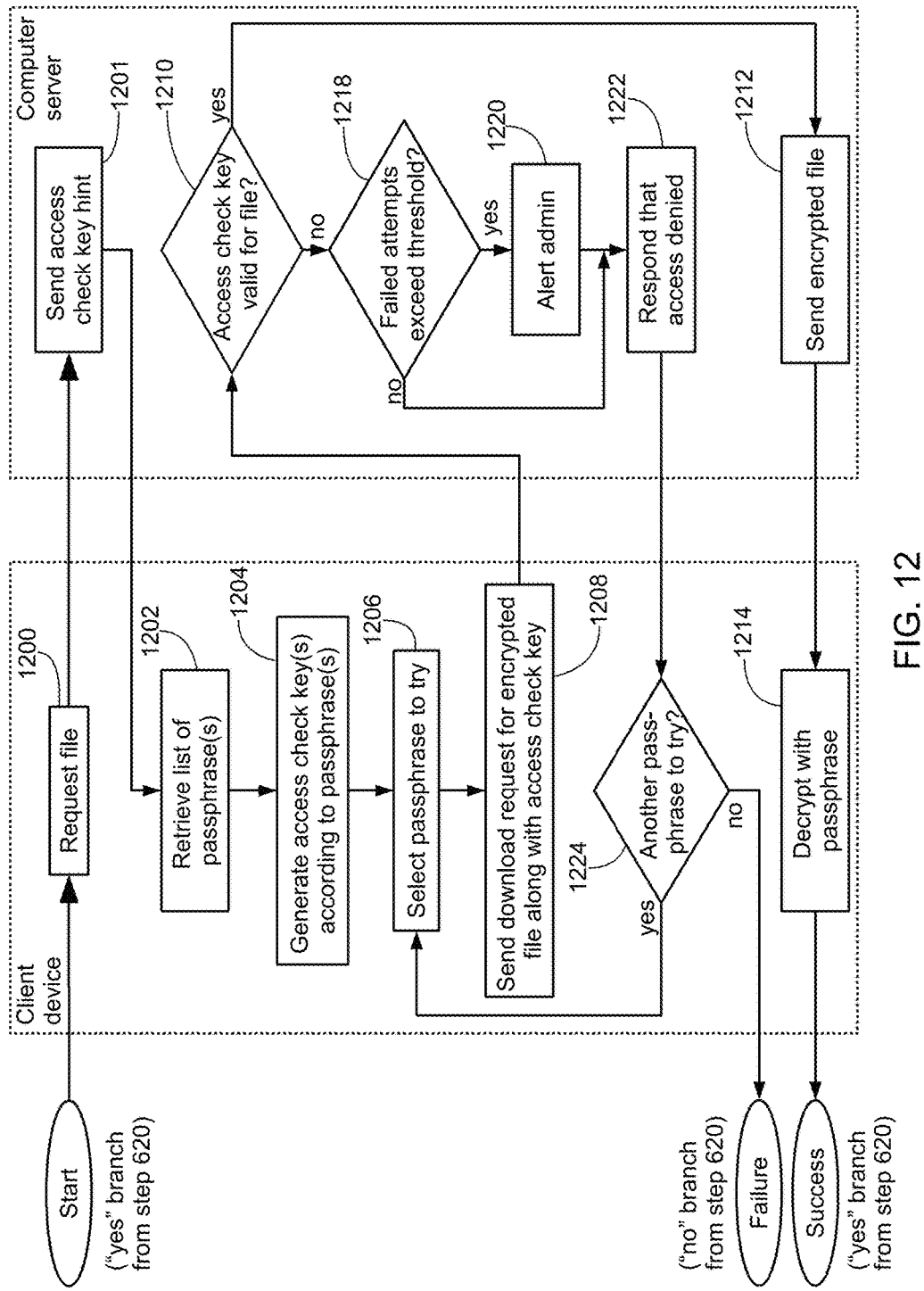
FIG. 12 is a flowchart of steps in a download process used to transfer centrally stored encrypted files from a server to one or more client device according to an exemplary embodiment.

At step 622, the server 104 determines whether the user from which the file download request was received is authorized to download the requested file 123, 125. For instance, the requested file 123, 125 may need to be associated with a same conversation with which the requesting user is associated. Likewise, the requested file 123, 125 may need to have been uploaded by a user from which the requesting user is able to monitor declared hash updates. Any suitable download permissions may be configured according to user links and conversation associations. To further increase security, the authorization process performed at step 622 may involve an access check handshake performed between the client device 130, 160 making the download request and the server 104 before the server 104 will transmit the requested file 123, 125 at step 624. FIG. 12 shows an example of an encrypted file download process according to an exemplary embodiment. When the requesting user is authorized to download the requested file 123, 125, control proceeds to step 624; otherwise, control proceeds to step 626.

At step 624, the server 104 transmits the requested file 123, 125 to the client device 130, 160 from which the request was received.

At step 626, the server 104 determines whether the conversation is now finished. This step corresponds to and is the server 104 counterpart of step 538 previously described for FIG. 5. When the conversation is finished, control proceeds to step 628; otherwise, control returns via the "P" node back to the restart the loop at step 602.

At step 628, the server 104 marks the conversation closed in the central database 112. This step may also involve the server 104 storing an archive of the history of the conversation in the central repository 114 so that the users involved in the conversation may at a later time review the status updates, dates, comments, and other metadata that was entered into the conversation while it was active.

In the above examples, each user associated with a particular conversation has a single declared hash value 118, 120 for that particular conversation. Each declared hash value 118, 120 is calculated by running a hash function on the content of the declared file 122, 124 (see step 510 of FIG. 5 for example). However, the system 100 is not limited to only allowing each user to declare a single file 118, 120 per conversation. In some embodiments, a user may declare multiple files 122 per conversation. For example, a user may declare a folder of multiple files (and possibly including other sub-folders of files) to a conversation.

Figure 7:
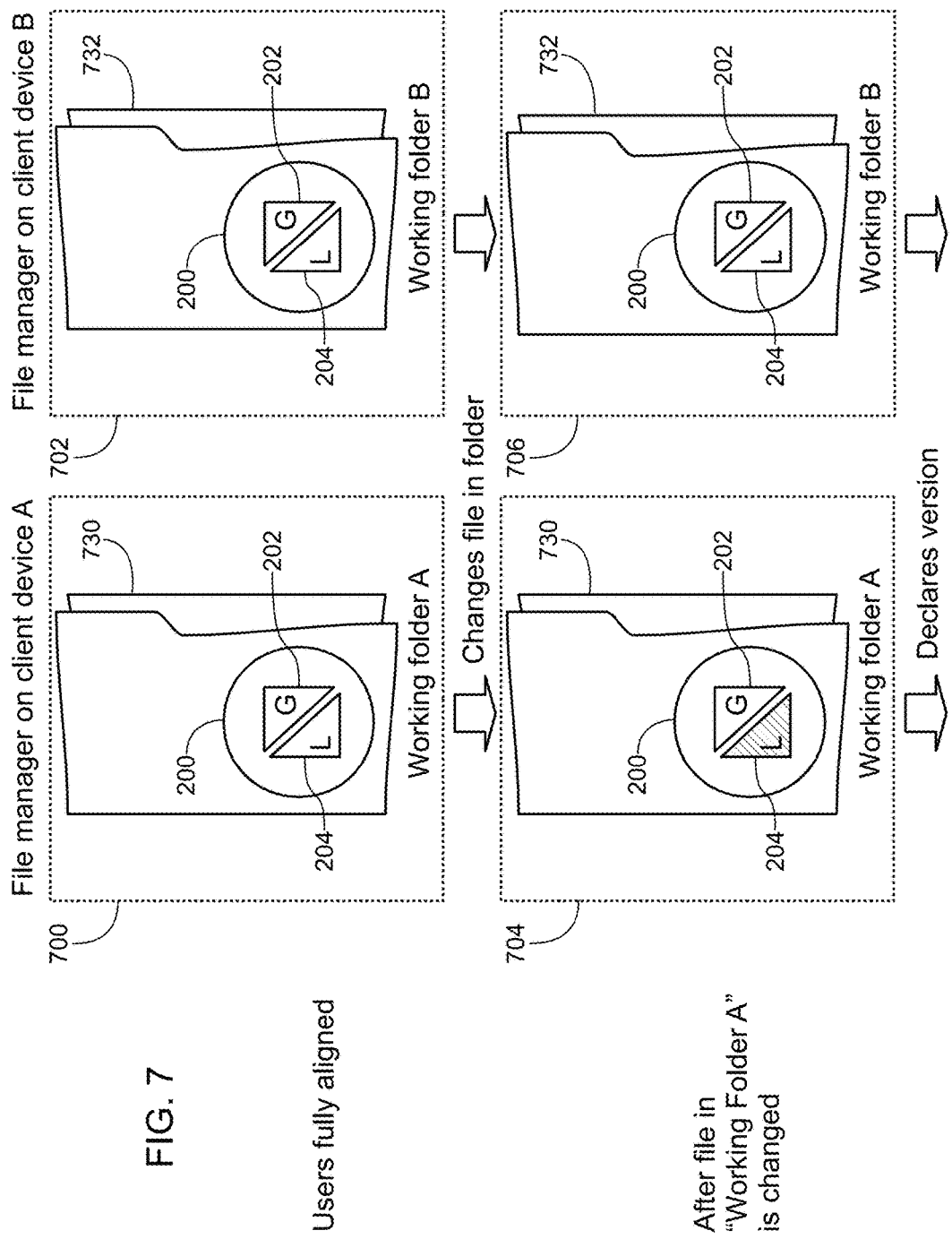
FIG. 7 and FIG. 8 in combination illustrate an example use case scenario of the alignment icon of FIG. 2 tracking file version alignment of folders.
Figure 8:
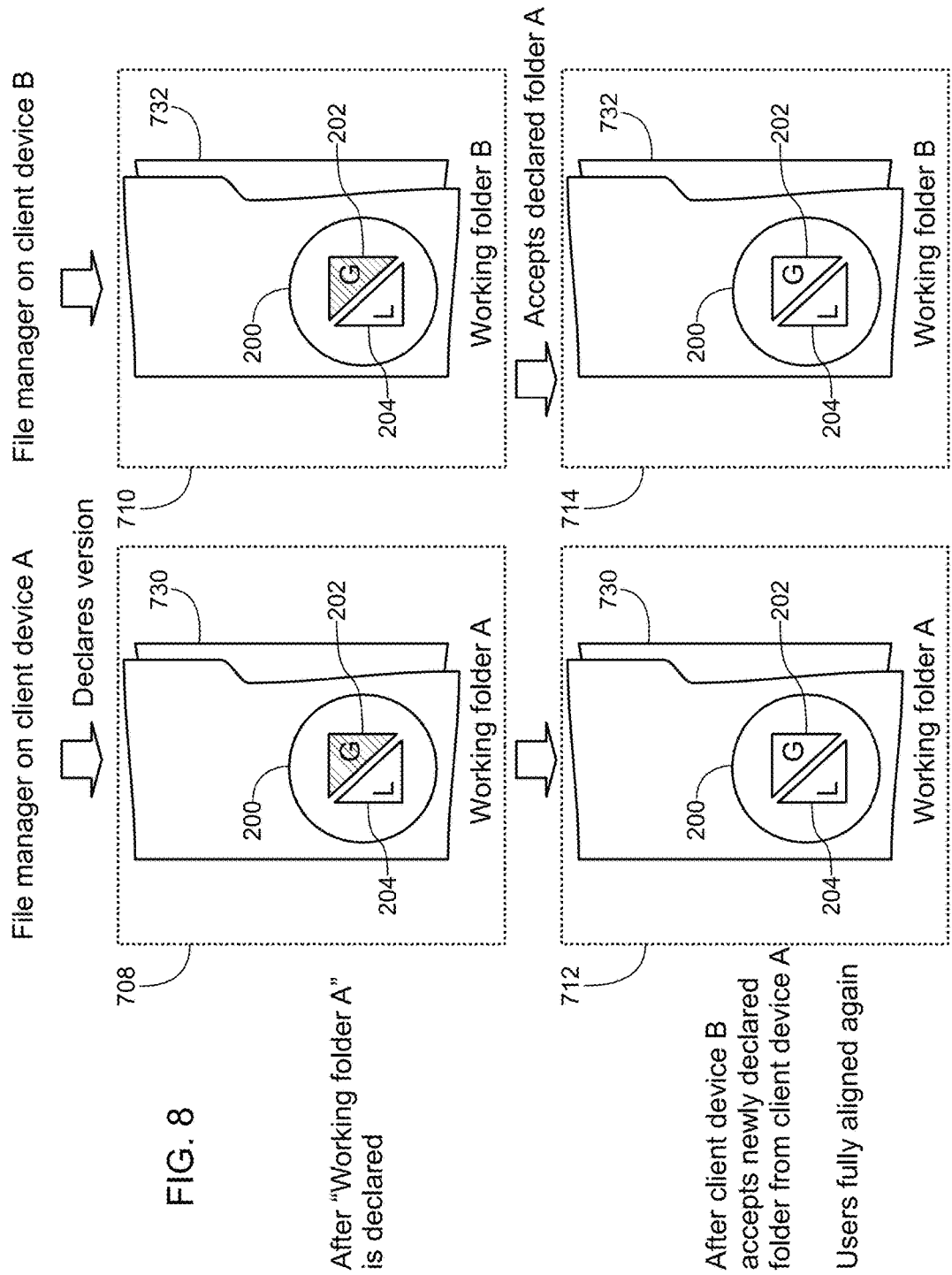

FIG. 7 and FIG. 8 in combination illustrate an example use case scenario of the alignment icon 200 tracking the alignment of folders 730, 732. In other words, rather than a working file 154, 184 such as a single document being associated with the conversation, a user may have a working folder 730, 732 and right-click on the folder 730, 732 in order to enter the context menu and declare the whole folder 730, 732 to the conversation.

For ease of description, the example of FIG. 7 and FIG. 8 again includes just two users corresponding to the first client device 130 and the second client device 160. The example starts at the top row of FIG. 7 where both users have working folders 730, 732 that are in alignment with each other. As shown in file manager screen 700, the user of the first client device 130 has declared a first working folder 730 to the conversation and the alignment icon 200 is overlaid on the icon representing the first declared folder 730. Likewise, as shown in file manager screen 702, the user of the second client device 160 has declared second working folder 732 to the conversation and the alignment icon 200 is therefore also overlaid on the icon representing the second declared folder 732.

In the previously described step 510 of FIG. 5, a client device 130, 160 calculates a hash value of a single declared file 118, 120; however, in this embodiment, step 510 is modified so that the client device 130, 160 loops recursively through all the files in the newly declared working folder 730, 732 and calculates a declared hash value 118, 120 for each file. For instance, the first client device 130 may generate a list of declared hash values associated with the first working folder 730 as follows:

TABLE 1

Hash values for first working folder 730 ("C:\work")
Conversation ID: 455662

| Declared file | Declared hash |
| --- | --- |
| file1.docx | 6228d1b4301aefb14adef3f23bf1e0b16cc85a27 |
| file2.docx | 09e376ca369d7547f926a79bb096f0987173532b |
| numbers.xlsx | 2611fca7decb605a4bdb8341ddb16154f90e765b |
| old_stuff\notes.txt | 83949c628ff32a06472ecaa5ee02ff2f4150a8f1 |

Steps 510 and 512 of FIG. 5 are modified in this embodiment so that entire list of declared hash values along with filenames is both stored as a set of declared hash values in the local database 130 and transmitted from the first client device 130 to the computer server 104 as a set of declared hash values for the user in this particular conversation (i.e., conversation ID 455662 in this example).

Because the first working folder 730 starts in this example fully aligned with the second working folder 732, it follows that the second client device 160 would have previously generated a same list of declared hash values associated with the second working folder 732 and both stored this list locally and transmitted it to the server 104 as follows:

TABLE 2

Hash values for second working folder 732 ("D:\project")
Conversation ID: 455662

| Declared file | Declared hash |
| --- | --- |
| file1.docx | 6228d1b4301aefb14adef3f23bf1e0b16cc85a27 |
| file2.docx | 09e376ca369d7547f926a79bb096f0987173532b |
| numbers.xlsx | 2611fca7decb605a4bdb8341ddb16154f90e765b |
| old_stuff\notes.txt | 83949c628ff32a06472ecaa5ee02ff2f4150a8f1 |

Step 612 of FIG. 6 is also modified in this embodiment to cause the server 104 to compare the lists of declared hash values shown above in Tables 1 and 2 in order to determine the count of how many different lists have been declared by the various users in the conversation. For instance, at the time when both users are in alignment as shown in the top row of FIG. 7, both Table 1 and Table 2 have the same exact set of files and declared hashes. For this reason, the server 104 at step 612 determines there is a single unique declared set of hash values for both users in this example. The group alignment status therefore indicates the group is in alignment.

It is not required in this embodiment that the actual folder names and/or locations of the first and second working folders 730, 732 need to be the same on the first and second client devices 130, 160 (i.e., "C:\work" on the first client 130 is not the same as "D:\project" on the second client 160), but the names and relative locations along with the declared hashes of the files within these working folders 730, 732 do need match in order to be considered in group alignment. If there are any differences including filename differences, missing or added files, or different hash values for any particular file between two different users then the server 104 will determine that these users each have a unique (different) set of declared hash values and the count of unique sets across the users will be determined greater than one by the server 104 at step 612.

As shown in the top row of FIG. 7, the file manager screens 700, 702 shown on the first and second client devices 130, 160 both have white group alignment indications 202 and white local alignment indications 204. The white group alignment indications 202 indicate that server 104 has found the sets of declared hash values are the same for both users in this conversation, as is shown in Tables 1 and 2 above. The white local alignment indications 204 indicate that neither of the first working folder 730 nor second working folder 732 have been modified in any way since they were respectively declared. In other words, if the first client device 130 loops recursively through the files in the first working folder 730 and generates a set of working hashes for that folder 730, the first client device 130 will find that the set of working hashes exactly matches the above set of declared hashes shown in Table 1. A similar situation also exists on the second client device 160 with respect to the second working folder 732.

The example use case scenario of FIG. 7 continues by assuming that the user of the first client device makes a change within the first working folder 730. A change includes the user modifying one or more of the files within that folder 730, deleting one or more of the files in that folder 730, or adding a new file to that folder. Changes within subfolders of the first working folder 730 are also considered as a modification in this embodiment because the first client device 130 recursively loops through all the subfolders as well. After any change is made to the first working folder 730, the example proceeds to the bottom row of FIG. 7.

As shown on the bottom row of FIG. 7, the first client device 130 has found that the set of working hash values for the first working folder 730 no longer matches the set of declared hash values shown above in Table 1. For instance, after the user makes a change to "numbers.xlsx" in this example, the first client device 130 may generate a set of working hash values at step 522 as follows:

TABLE 3

Hash values for first working folder 730 ("C:\work")
Conversation ID: 455662

| Working file | Working hash |
| --- | --- |
| file1.docx | 6228d1b4301aefb14adef3f23bf1e0b16cc85a27 |
| file2.docx | 09e376ca369d7547f926a79bb096f0987173532b |
| numbers.xlsx | 98bb64757d73f903dbba6e5e02a5adc7412d4b45 |
| old_stuff\notes.txt | 83949c628ff32a06472ecaa5ee02ff2f4150a8f1 |

Since the set of working hash values shown in Table 3 no longer matches exactly the set of declared hash values for this user as shown in Table 1, the local alignment icon 204 on file manager screen 704 shown on the first client device 130 is changed to black. This indicates to the user that the first working folder 730 no longer matches the content of the folder when it was previously declared.

At the time of the bottom row in FIG. 7, the second client device 160 still has both the group and local alignment indications 202, 204 shown as white indicating alignment in this example. In particular, a change to the first working folder 730 on the first client device 130 does not in and of itself directly affect the second client device 160.

The use case example continues when the user of the first client device 130 declares the first working folder 730. This involves the first client device 130 updating its local set of declared hash values to match the above values shown in Table 3 and also sending this set of declared hash values to the computer server 104 via the network. The computer server receives the newly declared set of hash values (at step 606) and then finds at step 612 that the newly declared set of hash values (Table 3) do not match the set of declared hash values associated with the user of the second client device 160 (Table 2). For this reason, the server sends at step 614 a message with new group alignment status to both the first client device 130 and the second client device 160. The new group alignment status informs these clients 130, 160 that they are no longer in group alignment for the conversation. The users then see the file manager screens as shown in the top row of FIG. 8.

As shown in the top row of FIG. 8, the group alignment indication 202 is changed by the respective client devices 130, 160 to be black. This indicates to the users that they are no longer in group alignment for the conversation.

In this example, it is assumed that the user of the second client device 160 decides to accept the changes made by the user of the first client device 130. In particular, the second client device 160 may request and download, at steps 530 and 532 of FIG. 5, the declared file ("numbers.xlsx"). In this embodiment, the server 104 sends the new set of first declared hashes (Table 3) to the second client device 160. The second client device 160 may then compare each individual file on the new set of declared hashes (Table 3) from the first client 130 with the set of working hash values and/or declared hash values (Table 2) at the second client device 160. The differences indicate to the user which files have been changed (or are added/removed), for example, only the hash of "numbers.xlsx" has changed in this example.

Alternatively, the user of the second client device 160 may simply enter the second working folder 732 in the file manager and then the file manager will overlay an alignment icon 200 on each individual document and other file according to the group and local alignment on that file as previously described in FIG. 2. For instance, the client devices 130, 160 determine whether there is more than one declared hash value across the group of users for a particular file to determine the group alignment icon 202 for that particular file, and compare the working hash calculated for a particular file with the user's currently declared hash for that particular file to determine the local alignment icon 204 for that particular file. Since only the file "numbers.xlsx" has a different declared hash value between Table 3 and Table 2 in this example, "numbers.xlsx" will be the only file on which the group alignment indication 202 is black; all other files in the working folders 730, 732 on both user device's will have white group alignment indications 202. Given this information, the user of the second client server 160 can then request a comparison (step 530) to see the changes made to the "numbers.xlsx" file (the only file out of group alignment at this point in time) and if desired accept those changes at step 534.

After the user of the second client device 160 has accepted the changes, the user is assumed to re-declare the second working folder 732 ("yes" branch from step 506). The second client device 160 then calculates a new set of second declared hash values at step 510 by looping recursively through the files in the second working folder 732. Since the user accepted the changes, the new set of second declared hash values will match those declared by the first client device.

TABLE 4

Hash values for second working folder 732 ("D:\project")
Conversation ID: 455662

| Working file | Working hash |
| --- | --- |
| file1.docx | 6228d1b4301aefb14adef3f23bf1e0b16cc85a27 |
| file2.docx | 09e376ca369d7547f926a79bb096f0987173532b |
| numbers.xlsx | 98bb64757d73f903dbba6e5e02a5adc7412d4b45 |
| old_stuff\notes.txt | 83949c628ff32a06472ecaa5ee02ff2f4150a8f1 |

This set of second declared hash values are stored at the second client 160 and are also transmitted up to the server 104. The server 104 compares this new set of hash values (Table 4) with the set (Table 3) previously declared from the first client 130 and finds they are the same. Both clients have the exact same set of declared hashes so the server 104 sends updated group alignment status back down to each of the client devices 130, 160.

As shown on the bottom row of FIG. 8, the alignment icons 200 on both client devices 130, 160 each include a white group alignment indication 202 indicating that the set of declared hash values (Tables 3 and 4) match each other across the group of users. The alignment icons 200 on both client devices 130, 160 also each include a white local alignment indication 204 indicating that the set of working hashes currently calculated on the working folders 730, 732 still match the set of declared hashes (Tables 3 and 4). In other words, both users are looking at the same set of files in their respective working folder 730, 732, and both users have declared this same set of files to the group. The two users are back into full alignment in the conversation.

In another modification, a hash may be calculated on the content of the above Tables 1-4 and then utilized as the declared hash for that working folder as a whole. This would greatly reduce the amount of information that needs to be sent to the server 104. The server can also quickly ascertain whether two user's groups of files are in alignment by simply comparing the first and second declared hash values, which were respectively calculated according to the content of the above listing of different hash values for all the files in user's declared set of files. One disadvantage of this would be that the users would only know whether or not they are in group folder alignment but would not know which particular files are different if they are not in group alignment. However, there may be many applications where the particular files do not matter but what matters is whether the group of files are in alignment as a whole.

Working folders 730, 732 are not the only way that a plurality of declared files can be associated per user to a conversation. Another way is to instead simply keep a list of the plurality of declared files 122 in the database 140. The process can otherwise be the same as described above. If the user wishes to see an alignment icon that indicates the group of files as a whole, a project file with a designated extension may be stored and the group folder alignment icon may be displayed on that file. Another way to do a similar thing is to use the libraries functionally of Windows® where a collection of files not necessarily all located with a same directory are shown in a single library window. In this case, the group folder alignment icon can be displayed on the library icon.

FIG. 9 is a flowchart of steps in an icon overlay process to display the alignment icon 200 on files and folders according to an exemplary embodiment. The steps of FIG. 9 may be performed by the processors 132, 162 of each client device 130 executing software 146, 176 loaded from a memory such as storage device 138, 168. In one embodiment, the software 146, 176 includes a file manager program that supports dynamic link libraries (DLLs). The flowchart of FIG. 9 may be implemented as one such dynamic link library for execution each time a view cycle is performed by the file manager. The steps of the flowchart in FIG. 9 are not restricted to the exact order shown, and, in other configurations, shown steps may be omitted or other intermediate steps added. To simplify the explanation, the flowchart will be described from the point of view of the first client device 130; however, it is to be understood that each client device 130, 160 in a particular group of users may perform the following operations in similar manner. In this embodiment, the first client device 130 performs the following operations:

The process begins at step 900 when triggered for a particular file by one of a plurality of events. In this embodiment, the process of FIG. 9 is integrated with a file manager on the client device 130 and can therefore be triggered by any event that causes the file manager to refresh a folder view. Examples of possible triggers include a folder being opened for display, write activity has occurred to a file, write activity has occurred to the alternative data stream (ADS) of a file, the desktop is being displayed, etc. Further, in some cases it may beneficial to deliberately trigger the process at step 900, for example, when step 518 is reached in the flowchart of FIG. 5 the alignment icons of the displayed folder may need to be updated. Step 900 is triggered for a particular file and the remaining steps refer to this file. For instance, the process may be triggered when the first client device 130 displays a folder containing: the first working file 154, the first working folder 730, or any file within the first working folder 730 or one of its subfolders.

At step 902, the client device 130 checks whether there are already results cached for the file that triggered the process at step 900. On Windows® computers, the file manager may in create an instance of the process of FIG. 9 and then trigger it at step 900 for a particular file several times according to different trigger events that apply. In other situations, the different ways the event is triggered (perhaps in different file manager windows for example) may matter; however, in this embodiment the alignment icon 200 results are the same for the file regardless of how it is triggered. For this reason, step 902 of FIG. 9 involves checking to see if the results are already determined and cached. If yes, the process proceeds to step 904 to use these already calculated results. If no cached results are available, control proceeds to step 908.

At step 904, the client device 130 loads the cached results for the file that triggered the process at step 900.

At step 906, the client device 130 passes the results to the file manager for display as the alignment icon 200 overlaid over the icon representation of the file that triggered the process at step 900. In this embodiment, the results include color values for both the group alignment indication 202 and the local alignment indication 204.

At step 908, the client device 130 checks whether file tracking data exists for the file that triggered the process at step 900. As previously described, in some embodiments, when a working file 154 is associated with a conversation at step 508, the conversation identifier and a hash of the user identifier (or the client/device/repo identifier) are stored in an alternate data stream (ADS) for the file. At step 908, the client device 130 checks to see if there exists such an alternate data stream for the file that has triggered the icon over lay process at step 900. As previously described in other embodiments, when a working file is associated with a conversation at step 508, the conversation identifier and a hash of the user identifier (or the client device identifier) are stored in in extended data attributes or a resource fork of the file, or in the local database 140 or another counterpart file stored in a predetermined location. Depending on where the file tracking data is stored, the client device 130 checks said location. If no tracking data exists for the file, then the file is not associated with any active conversation and control proceeds to step 910. Otherwise, if there is tracking data available for the file, control proceeds to step 914.

At step 910, the client device 130 sets a NULL result meaning that no alignment icon 200 needs to be displayed for this file.

At step 912, the client device 130 caches the results determined previously. When coming from step 910 the results are simply a NULL result indicating no alignment icon 200 should be displayed. When the results come from steps 930 or 932, they will include two color values: one for the group alignment indication 202 and one for the local alignment indication 204. As previously mentioned, the next time this process is triggered for this same file or folder, if these cached results still exist when step 902 is performed they will be utilized directly. It should be noted that, on Window®, such cached results stored at step 912 are only stored temporarily and will be automatically destroyed as soon as the dynamic link library implementing the flowchart of FIG. 9 is finished with a particular view cycle.

At step 914, the client device 130 reads the file tracking data.

At step 916, the client device 130 determines whether the file is a part of a conversation on this client device 130. As previously described, in some embodiments, the file tracking data is stored in an alternate data stream associated with the file. Since this alternate data stream may be copied along with the file from location to location, it's possible that some files may include file tracking data that is not valid on the client device 130 where the file is currently located. For example, the conversation identifier, user identifier and/or repo and client device identifiers (or hashes of these values) may not match the client device 130 or the user of the client device 130 on which the file is being displayed. In another example, the file tracking data may indicate the file is associated with a conversation identifier to which the client device 130 or the user of the client device is not associated. In these cases, the control proceeds to step 910 where the file tracking data is ignored and no alignment icon 200 is displayed. Alternatively, if the file tracking data does include valid information and the file is associated with a valid conversation identifier that matches the user and/or the client device 130, control proceeds to step 918.

At step 918, the client device 130 loads the group alignment status and the declared hash(es) from the local database 140.

The group alignment status was previously sent by the server 104 at step 614 and received by the client device 130 at step 526. The declared hash(es) loaded at this step refers to either a single declared hash 118 if the process was triggered at step 900 on a single file, or the set of declared hashes (e.g., Table 1) if the process was triggered on a folder.

At step 920, the client device 130 calculates working hash(es) on the current content of the file or folder on which the process was triggered at step 900. For example, if the process was triggered on a single file such as the first working file 154, the client device 130 calculates the first working hash 150 on the content of this file 154. Alternatively, if the process was triggered on a folder such as the first working folder 730, the client device 130 calculates a set of working hashes such as those shown above in Table 3. In another embodiments, the working hash(es) may already be calculated and stored in the local database 130 or another location such as the within the file tracking data. For example, the timestamp of a working hash previously calculated on the contents of a particular file may be later than the modification timestamp of the file. In this case, the client device 130 can save time by simply loading the already calculated working hash(es) rather than recalculating.

At step 922, the client device 130 determines whether the group declared hash count is one. In this embodiment, the server 104 counts the number of unique declared hash values at step 612 and sends this declared hash count to the client device 130 at step 614. When the group declared hash count is one (meaning group is in alignment), control proceeds to step 924; alternatively, when the group declared hash count is greater than one (meaning group is not is alignment), control proceeds to step 926.

At step 924, the client device 130 assigns the group alignment result to "yes", which in this embodiment means the group alignment indication 202 will be displayed in white.

At step 926, the client device 130 assigns the group alignment result to "no", which in this embodiment means the group alignment indication 202 will be displayed in black.

At step 928, the client device 130 checks whether the declared hash(es) previously declared to the conversation by this client device 130 match(es) the working hash(es) calculated or loaded for the file/folder at step 920. Again, if the process was triggered on a single file at step 900, the working hash value 154 for this file is compared to the declared hash value 118 for this file. On the other hand, if the process was triggered at step 900 on a folder, the set of working hashes for this folder such as those shown above in Table 3 are compared to the set of declared hash values for this folder (i.e., the values in Table 1). When there is a match between the current working hashes and the declared hash (es), control proceeds to step 930; alternatively, when the working and declared hash(es) are not the same, control proceeds to step 932.

At step 930, the client device 130 assigns the local alignment result to "yes", which in this embodiment means the local alignment indication 204 will be displayed in white.

At step 932, the client device 130 assigns the local alignment result to "no", which in this embodiment means the local alignment indication 204 will be displayed in black.

Figure 10:
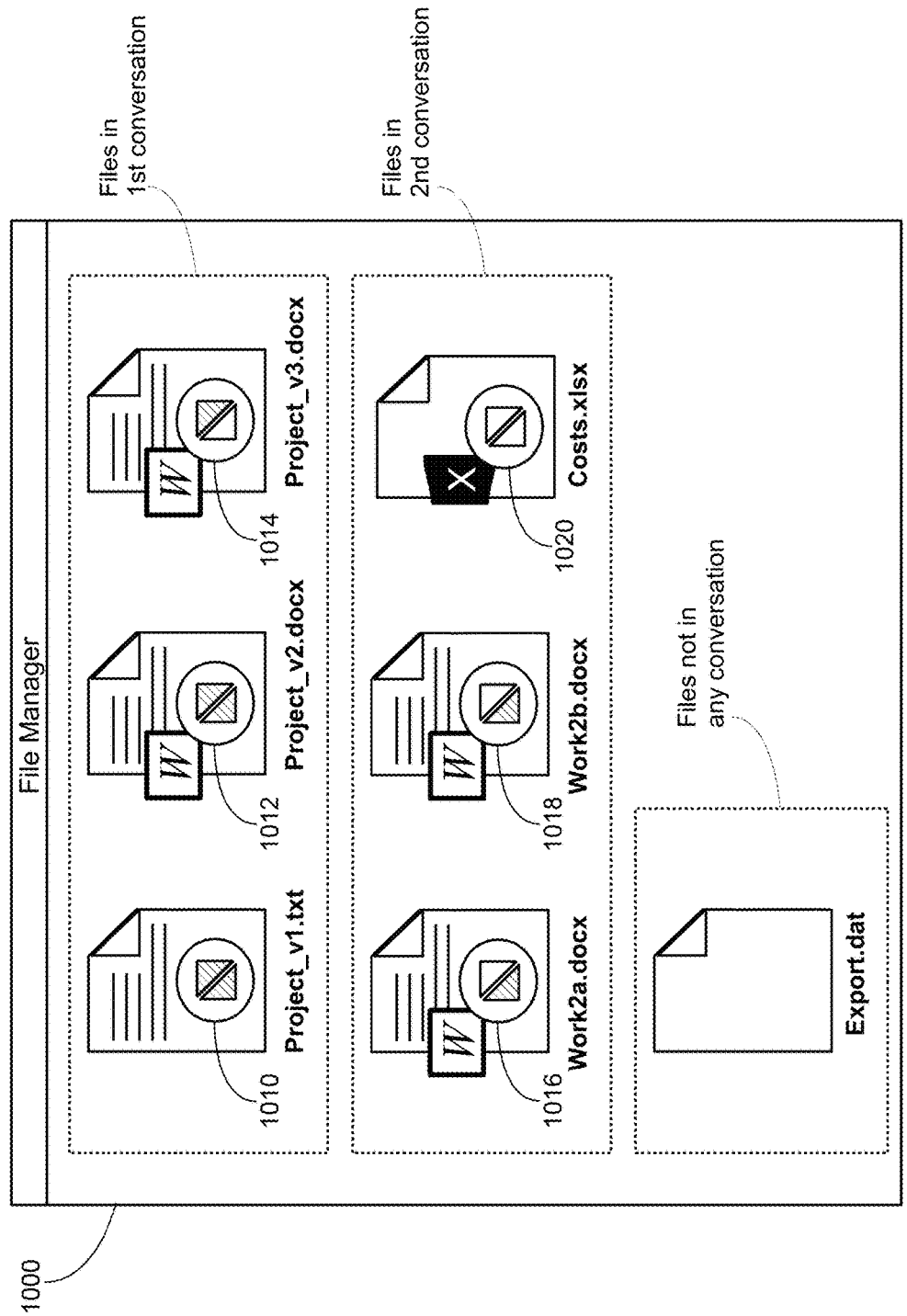
FIG. 10 shows an example file manager screen with file alignment icons of FIG. 2 displayed by a client device for multiple conversations according to an exemplary embodiment.

On some client devices such as Windows® based clients, the file manager needs a trigger condition to occur in order to trigger the icon overlay process at step 900 of FIG. 9. As shown in FIG. 10, a user may have a plurality of different files associated with a single conversation. It is also possible for a user to have a single file associated with multiple conversations. If new group status information is received from the server 104, it would be beneficial if the file manager would automatically update the alignment icon 200 on all files associated with the conversation that need to be updated. To facilitate this functionality, the local database 140 on the client device 130 also stores location information for each of the known files associated with each conversation. That is, even though the first working file 154 is associated with a first conversation by storing the conversation identifier in an ADS associated with the first working file 154, the client device 130 also updates the database 140 to store the location (including path and filename) of the first working file 154 in the database. As previously mentioned, the ADS also stores a hash of this file location, and this file location hash may also be stored in the database 140 to easily identify the file according to its location hash. When new group alignment status is received at step 526, the client device 130 will trigger the icon overlay refresh for all files on the client device 130 that are associated with the conversation. In some embodiments, this is done by reading and then rewriting the first byte of the ADS for each of the files associated with the conversation. This triggers the icon overlay process at step 900 for that file and makes sure that the alignment icon 200 for that file will be updated automatically when new group alignment status information is received from the server 104.

To detect moved and renamed files associated a conversation, a new step can be inserted into FIG. 9 to detect location updates before returning the results to the file system. The new step involves reading the hash of the file location in the ADS (or other file tracking data) for the file that triggered the process of FIG. 9. The client device 130 then compares the location hash as read from the ADS with a hash of the file location (including path and filename) of the file that triggered the icon display process. If the two location hashes match, this means the file has not changed position. However, if the two location hashes do not match, the client device 130 determines that the file that triggered the icon overlay process of FIG. 9 has been moved or renamed and therefore is not in the database 140. The client device 130 pushes the location of the file to a request queue in order to synchronize and update the local database. The request queue is utilized to avoid the icon overlay process of FIG. 9 actually having to process the move, instead it just detects it and therefore icon overlays still occur very quickly in the file manager.

FIG. 10 shows an example file manager screen 1000 with file alignment icons 1010, 1012, 1014, 1016, 1018, 1020 displayed by a client device 130, 160 according to an exemplary embodiment. In this example, the file manager is Windows® explorer and the above-described icon overlay process of FIG. 9 is performed separately for each of the files shown in this file manager screen 1000.

In the displayed folder, there are three files belonging to a first conversation, three files associated with a second conversation, and a single file not associated with any conversations. The alignment icons 1010, 1012, 1014 overlaid on the files in the first conversation have black group alignment indications indicating that the users associated with this conversation have at least one different declared hash 118, 120 between them. The alignment icons on "Project_v1.txt" and "Project_v2.docx" also have black local alignment indications indicating that these files do not match the content of the user's declared file 122 for the first conversation. In contrast, the file "Project_v3.docx" has a white local alignment indication indicating that the content in this file does match the user's declared file 118 for the first conversation.

The three files belonging to the second conversation each have white group alignment indications indicating that the users associated with this second conversation all have the same declared hash value 118, 120 and are therefore in group alignment. The alignment icons on "Work2a.docx" and "Work2b.docx" have black local alignment indications indicating that these files do not match the content of the user's declared file 122 for the second conversation. In contrast, the file "Costs.xlsx" has a white local alignment indication indicating that the content in this file does match the user's declared file 118 for the second conversation.

As shown, the extra file "Export.dat" in the folder is not associated with any conversation, i.e., because it has no file tracking data associated with ("no" branch of step 908 in FIG. 9) and therefore no alignment icon is overlaid on this file.

FIG. 11 is a flowchart of steps in an upload process with compression and optional encryption utilized when transferring declared files 122, 124 from a client device 130, 160 to the server 104. The steps of FIG. 11 may be performed by the processors 132, 162 of a client device 130, 160 executing software 146, 176 loaded from a memory such as storage device 138, 168. The process illustrated in FIG. 11 explains what happens during the execution of upload step 516 in FIG. 5 (also see declared file received step 616 in FIG. 6) according to an exemplary embodiment. The steps of the flowchart in FIG. 11 are not restricted to the exact order shown, and, in other configurations, shown steps may be omitted or other intermediate steps added. To simplify the explanation, the flowchart will be described from the point of view of the first client device 130; however, it is to be understood that each client device 130, 160 in a particular group of users may perform the following operations in similar manner. In this embodiment, the first client device 130 performs the following operations:

The process starts when control arrives at step 1100, which is this embodiment will happen after the client first device 130 has found that sharing of the declared file 122 or declared folder 730 is enabled at step 514. At step 1100, the first client device 130 compresses the first declared file 122 or the full declared folder 730 if the declared item was a folder. Compression in this embodiment involves running the content of the declared file/folder through the well-known ZIP compression algorithm in order to generate a compressed file; however, compression may involve any lossless archival process or algorithm.

At step 1102, the client device 130 determines whether there is a passphrase available for encryption. For instance, the dialog box where the user inputs comments, status and other metadata when declaring a file at step 506 may also include an input field for the user to enter a passphrase. This most recently utilized passphrase for each conversation may also be stored in the local database 140 and may be re-used automatically by the client device 130 each time the user chooses to share another file associated with that conversation to the computer server 104. When there is a passphrase specified to use for encryption, control proceeds to step 1106; otherwise, control proceeds to step 1104.

At step 1104, because there is no passphrase to use for encryption, the client device 130 simply uploads the compressed file generated at step 1100 to the server 104 without any encryption. In some embodiments, the client device 130 and the server 104 establish an encrypted connection with each over the Internet 102 to prevent other parties that may capture the data from being able to understand it.

At step 1106, the client device 130 salts and/or digests the passphrase thereby forming an encryption key to utilize for encryption. Any suitable mechanism for salting and hashing the passphrase may be utilized.

At step 1108, the client device 130 caches an encrypted version of the passphrase to the local database 140. This allows the client device 130 to re-use this same passphrase a next time a file in this conversation needs to be uploaded to the server 104 without requiring the user to manually re-enter the passphrase. For example, a next time the client device reaches step 1102 for a subsequent file upload, the client device 130 will find the cached version of the passphrase stored in this step 1108 is available for encrypting. Cached passphrase(s) may be permanently stored in the local database 140 or may be temporal and automatically deleted by the client device 130 at specific events such as the after a predetermined time duration of X minutes or days, after the user logs in or out, upon client shutdown or startup, etc.

At step 1110, the client device 130 generates an access check key 127 according to the encryption key. In this embodiment, the access check key 127 is a value formed by hashing a known number such as the client device identifier or the user identifier with the encryption key.

At step 1112, the client device 130 encrypts the compressed file content generated at step 1100 according to an encryption algorithm such as Blowfish, AES RC4, RC5, and RC6. The encryption key generated at step 1106 is utilized during the encryption process such that the encrypted data can only be unencrypted to by another party possessing the same encryption key.

At step 1114, the client device 130 transmits the access check key 127 generated at step 1110 to the server 104. As before, the connection with the computer server may be encrypted such as via an HTTPS connection so that third-parties will not be able to intercept the access check key during transmission.

At step 1116, the client device 130 transmits the encrypted file generated at step 1112 to the server 104. This file may be transmitted in a single POST message along with the access key transmitted to the server at step 1114 or may be sent over a separate connection. Again, the connection with the computer server may be encrypted such as via an HTTPS connection so the file contents will have double encryption—both encrypted at step 1112 and encrypted on the fly for transmission over the Internet 102.

The server 104 stores the received access check key 127 and encrypted file 123 in the central repository 114. For instance, assuming both the first client device 130 and the second client device 160 have shared encrypted versions of their respective first and second declared files 122, 124, the server stores the central encrypted first declared file 123 and its access check key 127 received from the first client 130 in the central repository 114, and stores the central encrypted second declared file 125 and its access check key 126 in the central repository 114.

FIG. 12 is a flowchart of steps in a download process used to transfer centrally stored encrypted declared file versions 123, 125 from the server 104 to one or more of the client device 130, 160. The steps of FIG. 12 labelled "client device" may be performed by the processors 132, 162 of a client device 130 executing software 146, 176 loaded from a memory such as storage device 138, 168 while the steps of FIG. 12 labelled "computer server" may be performed by the processors 106 of the server 104 executing software 116 loaded from a memory such as the central storage device 110. The process illustrated in FIG. 12 explains what happens during the execution of the download portion of step 532 of FIG. 5 along with the "user authorized for download" step 622 of FIG. 6 according to an exemplary embodiment. The steps of the flowchart in FIG. 12 are not restricted to the exact order shown, and, in other configurations, shown steps may be omitted or other intermediate steps added. To simplify the explanation, the flowchart will again be described from the point of view of the first client device 130; however, it is to be understood that each client device 130, 160 in a particular group of users may perform the following operations in similar manner. In this embodiment, the download operation involves the client device 130 and the server 104 performing the following operations:

The download process begins at step 1200 such as by the client device reaching the download portion of step 532 of FIG. 5. Alternatively, the download process at step 1200 may also begin when the user selects for download any file available in the conversation as reported in a dialog box displayed on the user interface 143 of the client device 130. For example, the user may choose to download an archived or early version representing a particular user's previously declared file. The server 104 then receives a file download request (see "yes" branch of step 620 of FIG. 6).

At step 1201, the server 104 sends an access check key hint. This may be some portion such as the first one or more bytes of the access check 127, 126 stored in the server for the requested file. Whether or not to send a hint may be a configurable settings in the conversation. The hint from the server 104 allows the clients to greatly reduce the number of failed access check attempts but at the cost of reducing the security a small amount.

At step 1202, the client device 130 retrieves a list of passphrase(s) that have been utilized recently in the conversation. As previously mentioned in the description of FIG. 11, the client device by default will cache an encrypted version of the passphrase to the local database 140 (see step 1108). Thus, at step 1202, the client device 130 retrieves (and decrypts) one or more of these cached passphrases. Furthermore, if there are no cached pass for this conversation stored in the local database 140, the client device 130 may prompt the user to enter one to try.

At step 1204, the client device 130 generates an access check key for each of the various passphrases on the list. The method to generate the access check key for each passphrase should be the same method that the client device 130 utilizes at step 1110 in order to generate an access check key when uploading an encrypted file. For instance, hashing a known number such as the client device identifier or the user identifier with the encryption key.

At step 1206, the client device 130 filters the list of access check key(s) generated at step 1204 according to the access key check hint (if any) received from the server 104 and then selects one of the passphrases to try. For example, if the access check hint from the server 104 represents the first byte of the access check key, the client device 130 will only select a passphrase to try that results in an access check key having the same first byte as the hint. If there are more than one possible passphrases that work with the hint, the client device selects one of the possible passphrases to try first. Likewise, if there is no hint available from the server 104, the client device 130 selects one of the list of passphrases to try first. For example, each cached passphrase may be timestamped for the last time it was successfully utilized and the client device 130 will automatically select the most recently successful passphrase to try first. Alternatively, if the user has elected to manually enter a passphrase at step 1202, the client device 130 may select the user's manually entered passphrase rather than any of the cached passphrases.

At step 1208, the client device 130 sends the download request for a particular encrypted file 123, 125 on the server 104 along with the access check key generated for the passphrase selected at step 1206. For instance, the first client device 130 may send a download request for the encrypted declared file 125, which is an encrypted version of the content of the second declared file 124 most recently declared by the user of the second client device 160.

At step 1210, the server 104 receives the download request along with the access check key. The server 104 checks whether the received access check key matches the access check key 126 stored in the central repository 114 for the requested file. For instance, again assuming the download request is for central version of the second declared file 125, the server 104 checks whether the access check key sent by the first client device 130 at step 1208 when asking to download the file 125 matches the access check key 126 stored at the server 104, which was sent by the second client device 160 at step 1114 when the file 125 was originally uploaded. If the access check key sent by the first client device 130 matches the access check key 126 stored in the central repository for the requested file 125, control proceeds to step 1212; otherwise, control proceeds to step 1218.

At step 1212, the server 104 sends the centrally stored requested file 125 to the client device 130 via the Internet 102. Again, the connection between the computer server 104 and the client 130 may be encrypted such as via an HTTPS connection so the file contents will have double encryption during routing over the Internet 102.

At step 1214, the client device 130 decrypts the received file contents utilizing the passphrase from which the successful access key check was determined at step 1206. To verify that the file was decrypted properly and has not been tampered with somewhere along the line, the client device 130 may also double check that the hash of the encrypted content matches the declared hash of the file as specified by the server. For instance, after decrypting the second central file version 125, the client device may double check that the unencrypted content has a hash value matching the second declared hash 120. If the hashes don't match, there is a problem. Both the user of the client device 130 and the admin device 180 may be sent and display an error message. Assuming the hashes match, the client device 130 has successfully downloaded and decrypted the requested file 125 and can proceed to use the contents of the file as desired. For example, the client device 130 may proceed to the compare portion of step 532 in FIG. 5 and/or may accept the changes at step 534.

At step 1218, the server 104 checks whether there have been a number of failed attempts by the client device 130 exceeding a failure threshold. For instance, each time the client device 130 fails to provide the correct access check 126 to the server 104 when requesting to download the central version of the second declared file 125, the server 104 may increment a counter in the database 112. The counter is specific to the first client device 130 and the central file 125 and tracks how many successive authorization failures have been made by that client 130 when trying to download that file 125. The failure threshold may be an administrator configurable setting exceeding what would be usually attempted by an actual user during normal operation. For example, the failure threshold may be one hundred in order to determine whether the client device 130 has repeatedly failed the access key check process over one hundred times. If the failed attempts has exceeded the failure threshold, control proceeds to step 1220; otherwise, control proceeds to step 1222.

At step 1220, the server 104 notifies the administrator of the server 104 that there is unusual activity occurring that may indicate a dictionary attack or other hacking attack by a rogue client device 130. Step 1220 may involve sending one or more email messages or other types of communication to an admin device 180, the messages specifying details of the situation such as the IP address of the particular client device 130 in question along with the purported user details of that client 130, the central file 125 attempting to be downloaded, the time duration of the failures, the number of failures so far, etc.

At step 1222, the server 104 responds to the requesting client device 130 that access is denied.

At step 1224, the client device 13 determines whether there is another passphrase available to try. For instance, if a list of passphrases was retrieved at step 1202 and/or there are more than one passphrases that meet the hint sent from the server 104, the client device may return to step 1206 in order automatically select the next passphrase to try. The client device 130 may also prompt the user to enter a valid passphrase for the requested file and then return to step 1202 in order to try the user's manually entered passphrase. Assuming there is at least one more passphrase to try, control returns to step 1206; otherwise, control proceeds to report download failure to the user.

It should be noted that, although a user may not be able to download an encrypted file due to lacking the access check key, the user may still be able to download an unencrypted version of that file stored on the server (if one was previously uploaded by a user in the conversation), and, if the declared hash value for both the unencrypted version and the encrypted version are the same, that means the actual content is the same as well.

An advantage of the upload/download processes according to the exemplary embodiments of FIG. 11 and FIG. 12 is that a client device 130 will only be permitted to download a centrally stored file version 123, 125 if that client device 130 can prove it possesses a valid passphrase to decrypt the file. Beneficially, the passphrases stay on the client device 130, 160 and are never transmitted over the Internet 102, the computer server 104 is not in possession of the passphrases and cannot decrypt the centrally stored files 123, 125, and if a rogue client attempts to guess passphrases using a dictionary attack, the central server 104 will become aware of the attack as soon as the number of guessed passphrases exceeds the failure threshold at step 1218.

Figure 13:
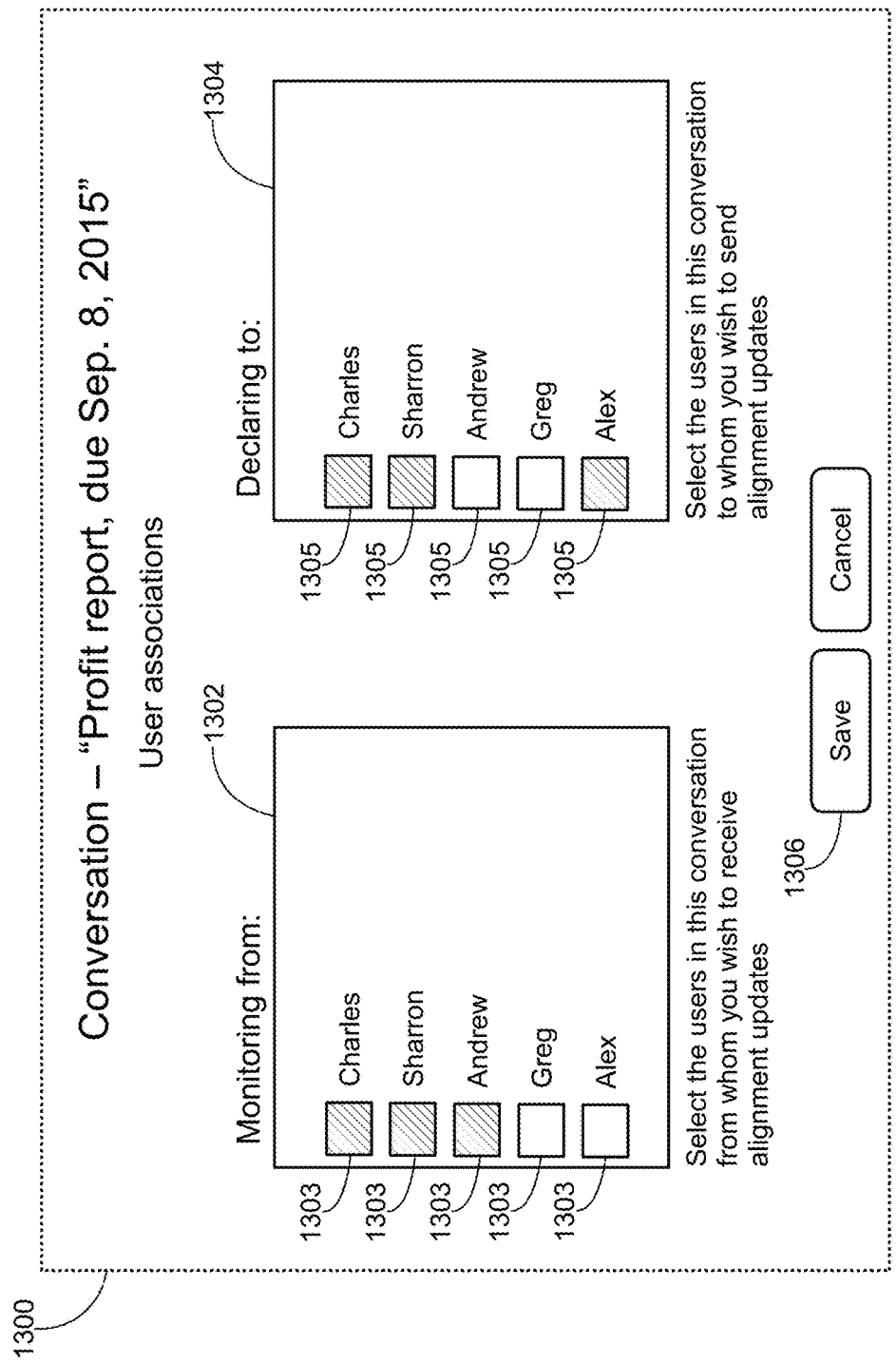
FIG. 13 shows an example user interface screen allowing a particular user to configure links to/from other users in a conversation for group alignment monitoring purposes in the system of FIG. 1.

FIG. 13 shows an example user interface screen 1300 allowing a particular user to configure links to/from other users in a conversation for group alignment monitoring purposes. Depending on how the links are established by each user, the server 104 will determine the subset of relevant users at step 612 of FIG. 6. As shown, a first section 1302 includes a number of toggle boxes 1303 allowing a user to determine which other users in the conversation the user is interested in monitoring. Likewise, a second section 1304 includes a number a toggle boxes 1305 allowing the user to specify to which others users in the conversation the user wishes to declare updates. The user may toggle any of the toggle boxes 1303, 1305, and each of the other users in the conversation may also have a similar screen allowing them to toggle both incoming and outgoing notifications. The toggle boxes 1303, 1305 shown in black are selected in this example while the toggle boxes 1303, 1305 in white are not selected. Only when a first user A has selected to declare to a second user B and the second user B has also selected to monitor updates from user A will the server 104 at step 612 send group alignment information to user B that reflects whether both user A and B are in alignment with their respective declared hash values 118, 120.

The user links selected in FIG. 13 may be for the conversation as a whole, or may alternatively be selected for each individual file within a conversation. For example, a particular user may wish to declare and monitor updates from other users in the conversation differently for select files associated with a conversation. It should also be noted that the user link selections in FIG. 13 may affect the automatic updating of the alignment icon 200. However, even if a first user selects to not monitor alignment updates from another user, e.g., not from the user "Alex" in FIG. 13, as long as that other user is declaring updates to the first user, the first user can still enter the Compare context menu in order to check for alignment if they so desire.

A sync conversation process may periodically run on each client device 130, 160 to synchronize and update information in the local database 140, 170.

Again taking the first client device 130 as an example, the sync process on the first client device 130 downloads a list of conversation(s) from the server 104 that are associated with the user of the client device 130. The downloaded conversation list includes the declared hash counts along with metadata such as user counts, title, comments etc. for each conversation identifier.

Another part of the sync process involves processing deletions of files associated with each conversation on the client device 130. The client device 130 iterates through the conversation location records in the database 140 in order to check whether each file location specified in the database 140 is still accessible and that the proper file still exists at that location. For instance, when a user declares the first working file 154 at step 506, the client device 130 will store in the database 140 the location (filename and path) of the first working file 154 in the database 140 when associating this file with the conversation at step 508. Then, during the sync process, the client device 130 will find this location record in the database and check to see if the first working file 154 still exists at that location. If the file is no longer present because the user has since deleted it, the sync process will clean up the database 140 by removing the location record for this file.

Another part of the sync process involves processing moves and renames of files associated with each conversation on the client device 130. As previously mentioned, in some embodiments, the icon overlay process of FIG. 9 involves detecting when a file is encountered that has file tracking data at step 908 that includes a location hash not matching the hash of the file's current location. This means the file has been moved or renamed (or copied from previous working file 154). As mentioned, the icon overlay process adds these mismatched file locations to a request queue. Low level I/O hooks can also be utilized to detect file copies, renames and moves and add such files to the request queue. During the sync process the request queue is processed in order to iterate through the requests.

For each request, the client device 130 firstly checks whether the requested file move is in a list of recent file moves. If yes, the client device 130 flags it as an alias caused from having the file open in multiple file manager windows that are displaying a same file under different virtual locations. For example, on Windows® a single working file 154 may be stored in a particular folder but also included in a library. If two file manager windows are open, one displaying the folder and one displaying the library, the location of the working file 154 will be different between the two file manager windows and the location hash in the ADS will not match a hash of the current location as seen by at least one of the file manager windows. The icon overlay process for that file manager will detect the location change and will add a request queue. However, the other file manager may then detect the location mismatch and itself add a request to the request queue. To prevent this conflict between two file managers, recent file moves that have been processed are saved in order to detect if another move for that same file occurs within a predetermined time period. When yes, the new move request is simply ignored.

Assuming the move request is not a recent move, the client device 130 checks the working file 154 at the new location into the repository 142, updates the file's location information in the local database 140, and resets the location hash in the ADS for the file. The sync process then returns to process a next file on the move request queue.

When moving or copying a file with an ADS to a file system not supporting an ADS, the ADS information will be lost. To prevent this, in some embodiments a file tracking data converter is employed to convert from one file tracking system such as ADS to another such as extended attributes. For example, the Linux® based SAMBA server for sharing files with windows may be modified to support receiving an incoming ADS from a file originating on a Windows® computer and then convert the ADS data to extended file attributes for storage on the Linux server, and vice versa. In this way, files that are sent back and forth between these systems will still remain associated with the conversation and client software running on both sides supporting the version control system will still overlay the file alignment icon 200 over these files even though they have crossed over from using one file system to another and the file tracking data method has changed.

The system 100 may also include a specialized print driver or print software installable at each of the client devices 130, 160. The print driver will add a water mark including the hash of the content of the file being printed so that a user looking at the print out will see the hash value or a part thereof. For instance, if a user of the first client device 130 prints the first working file 154, the printed results will actually include the first working hash 150 on the bottom (e.g. footer) or other predetermined location on each page of the print out. In this way, when users are comparing printed files they may immediately determine if they are each looking at a printout from the same version. Because the hash values 118, 150, 120, 180 utilized by system 100 internally may be too long for most users to easily read, the print driver may truncate the watermark hash value. For example, only the last five digits may be printed. Cloud based functionality to provide a .PDF or equivalent document with the source document's hash may be provided by server 104 and/or client devices 130, 160.

In an exemplary embodiment, a first declared hash value is calculated by running a hash function on content of a first declared file associated with a first client. A second declared hash value is calculated by running the hash function on content of a second declared file associated with a second client. A computer server compares the first declared hash value and the second declared hash value and sends group alignment status specifying whether the first declared hash value is the same as the second declared hash value to at least the first client. A group file alignment indication is displayed on a user interface of the first client according to the group alignment status received from the computer server. The group file alignment indication makes a user of the first client aware of whether the content of the first declared file matches the content of the second declared file.

Although the invention has been described in connection with preferred embodiments, it should be understood that various modifications, additions and alterations may be made to the invention by one skilled in the art.

For example, although each client device 130, 160 in FIG. 1 and the above description is shown as a separate device with self-contained storage devices 138, 168, in other embodiments, the storage devices 138, 168 may be cloud-based storage space provided by one or more computer servers 104 coupled to the Internet 104. In this way, each user will always be able to access their user files 144, 174; declared files 122, 124; and local repositories 142, 172 and databases 140, 170 regardless of what particular client device 130, 160 the user decides to utilize.

In an example of additions, the process of FIG. 5 may also start for other reasons besides a user creating a new conversation. For example, step 500 may be enhanced to include a user joining an existing conversation. For instance, the user may select a "Join Conversation" menu entry in the context menu. The client device 130 displays a list of existing conversation both including conversations to which the user has been invited but not yet joined, and possibly also including other conversations that have been marked "open" in their metadata indicating that they will accept other users to join without being specifically invited first.

Because there may be many conversations available to which a user could join, the client device 130 may automatically sort the list of conversations presented in the dialog box in order to show the most likely conversations of interest at the top where they will be easily found by the user. For instance, if the user has opened the join conversation function by right-clicking the context menu on a particular file, the client device 130 may check to see whether that particular file has an ADS or other file tracking data associating it with one or more conversations. These conversations may be listed first since it is likely the new user will want to join that same conversation. Further, if the user has been specifically invited to one or more conversations (see steps 502 and 504), these conversations may be listed preferentially as well. In yet another example, recent activity in a conversation may also push that conversation higher in the list. Any sort orders may be utilized to help the user find the conversation of interest.

In other embodiments, web access to the version control system 100 of FIG. 1 may be provided where a computer device including a web browser can act as a client device 130, 160 only utilizing the web browser. For example, a user may log into their cloud account and then the client-side steps described in the above and shown in the figures may be implemented within a web browser. In order for a web-based user to declare at file at step 506, the user may drag the file into the browser window. When the browser is an HTML5 or better browser capable of operating on file content, the browser itself running on the client device 130, 160 generates the hash at step 510 and then send just the hash to server 104 similar to as described above for FIG. 5. The browser essentially acts as the client device 130. However, some older browsers may not be capable of operating on content of files. With such an older browser, when a user drags a file into the browser to declare at step 506, the browser may display a dialog box asking the user for permission to upload the file to the server 104. Assuming the user agrees, the web browser uploads the newly declared file to the server and then the server 104 calculates the declared hash. In other words, it is not a strict requirement that the client device 130, 160 must generate the declared hashes 118, 120 and send to the server. Doing so is beneficial to reduce network requirements and help ensure user privacy by giving users the option not to upload their declared files 122, 124. However, some users may have only an older web browser but may still wish to declare a file to the group. Thus, as long as the user agrees, it is perfectly acceptable for a client device 130, 160 to send the actual declared file to the server 104 in order that the server 104 can calculate the hash. Depending on the sharing settings, the server 104 may immediately delete the uploaded file after calculating the declared hash 118, 120 (if the user does not want to share the uploaded file) or the server 104 may optionally compress and encrypt the file and store it as the central version 123, 125. Performing the client functions of the version control system in the browser is also beneficial to prevent the need to install or even run any specialized client software on the client device 130. As long as the client device 130 has a browser, the user of that client device 130 may join conversations and monitor alignment of files with one or more users.

To support encryption with users using browser-only access on client devices 130, 160, the centrally declared versions 123, 125 may be encrypted using well-known and existing protocols such as the ZIP program supported out of the box on most operating systems.

When a browser running on a client device 130 uploads a file to the server 104 (e.g., at either step 510 to have a hash calculated and/or at step 516), the browser may itself implement the ZIP protocol to dynamically compress and optionally encrypt the file to be uploaded on the fly. Alternatively, the user may first zip the file prior to uploading. Yet further, the file may be uploaded to the server 104 uncompressed and then be compressed and/or encrypted by the server 104 before being made available for download.

The content of a file at a particular time represents an aspect of the state of that file at that particular time. Embodiments of the invention leverage this fact in order by utilizing hash values calculated on the file content as a type of state identifier for the file. These state identifiers (e.g., hash values 118, 120) are sent to the server 104 for counting/comparison (e.g., at step 612). The hash values correspond to the content of the files, but unlike the actual content, the hash values are of a fixed size and relatively short in length.

In further embodiments, other types of state identifiers for files may also be utilized in a similar manner. For example, step 510 of FIG. 5 may be modified so that rather than determining a declared hash value 118 calculated according to the full content of the declared file 122, step 510 can be generalized to determine any state identifier that represents any state of the file at the time it is declared. The state identifier utilized can be different in different embodiments and may also be a user-configurable setting allowing users to select what aspect of the state of their files they care about for alignment monitoring purposes.

Examples of different state identifiers that may be utilized include any aspect of the metadata of a file such as the last modification time, the file size, the filename, the file location. Combinations of different metadata and/or content may also be utilized. The state identifier may also be the raw content of the file itself without generating a hash of that content, or may be any sub portion of content extracted the file. For example, some large files such as computer aided design (CAD) files may be very large and it may not be desirable to calculate hashes based on the content of these files. Therefore, rather than using a hash generated on the full content, the state identifier may simply be a part of the file such as the metadata of the title block extracted from the CAD file. Likewise, a first 100 KB of the file may be sufficient to act as the state identifier because that portion of the file may include data that always changes whenever a modification is made to the file. The state identifier of a file may also be information that is entered by the user of the file about the file but that does not form any part of the file. For example, when declaring a file to the group, a user may need to enter a status comment (e.g., "Pending", "Approved", "Draft", etc.) and this status comment may be utilized as the state identifier of that file. In this way, a plurality of users would be deemed to be in group alignment when their declared files all have the same status comment. The information used to monitor state may be a single piece of information or a set of information collected from different aspects of the file and/or information about the file. The information forming the state identifier may itself be hashed before sending to the server (at step 512) or may be sent in its raw form. Advantages of hashing the state identifier include preventing the exposure of the data that formed the state identifier and the fact that the size of the hashes can be small thereby facilitating quick network transmission. In summary, the various alignment indications 202, 204 of the alignment icons 200 can be automatically updated and toggled based on a match between any desired state identifier representing the state of a file at a particular time.

In another example modification, although the alignment icon 200 in the above examples utilizes two color values "white" and "black" for the group alignment indication 202 and the local alignment indication 204 depending on the information to be conveyed to the user, other colours and alignment indications may be utilized in other embodiments. For example, "orange" may be utilized to indicate misalignment and "blue" may be utilized to indicate alignment. Orange conveys the message to the user that something needs awareness while blue indicates all is well. In another configuration, "red" may be utilized to indicate misalignment and "green" utilized to indicate alignment. In yet another embodiment, different icons may be used instead of colours to represent different states of alignment. For instance an "X" shaped icon may be utilized to indicate misalignment while a checkmark shaped icon may be utilized to indicate alignment. A combination of colours and icons may be utilized in other embodiments. Furthermore, although in the above examples both the group alignment indication 202 and local alignment indication 204 are both included on the alignment icon 200, in other embodiments, only one of the group or local alignment indication 202, 204 may be determined and/or displayed. For instance a particular user may not be interested in tracking group alignment and therefore the client device 130, 160 of this user may be configured to only track and display local alignment indication 204. Likewise, a particular user may not be interested in tracking local alignment and therefore the client device 130, 160 of this particular user may be configured to only track and display group alignment indication 202.

Furthermore, additional alignment indications may also be displayed. For instance, as previously mentioned it is possible the first client device's 130 local repository 142 may be used to store checked in versions of the working file 154, even if these checked in versions are not declared or shared with other users in the conversation. The checked in versions operate as backups and allow the user to go back to an early version if they so desire. FIG. 14 shows an alignment icon 1400 that includes a repository alignment indication 1402. This indicates the state of the working file 154 matches one of the checked in files in the user's local repository. For instance, the repository alignment indication 1402 may indicate whether or not the working hash calculated on the content of the working file 154 matches a checked in hash calculated according to the content of the most recently checked in version of the working file 154 in the repository 142.

In another example, the system 100 can indicate alignment status against a master document. An example of an alignment icon showing master alignment is shown in FIG. 15. The master may simply be considered as another participant such as a user or device in a conversation, but there is nothing to prevent dealing with it as its own unique alignment state visually. Essentially the master indicator would behave similar to how the group indicator would if everyone in the conversation had things configured to ignore other users except the master record.

Because each user in a conversation may have a plurality of files associated to a single conversation either on a single device, or distributed across multiple devices, the alignment state between any given file instance can be compared against other instances. FIG. 16 illustrates an alignment icon that provides the user with information across all of master, group, local, repository, device, and file. As an example, a user may have a file duplicated with various file names in various folders on his work computer, while having another instance on his home computer. If a change to one instance of file occurs, the alignment icon shown in FIG. 16 is updated and the user can determine where all other instances exist and what their alignment states are. Likewise when looking at any given instance, the user will know its alignment status against the most recently version.

In yet another example, FIG. 17 is a pie chart alignment icon showing a distribution of users across a total of unique states. The specific user identifiers that match each other in each state are displayed. FIG. 18 shows another alignment icon 1700 providing similar information of which users are in which states but in bar chart form.

In another example modification, although the terms database, repository, file system, user files, software have been utilized to facilitate explanation of the above embodiments, in other embodiments different data storage structures may be utilized to replace and/or or augment the disclosed storage structures. For instance, any stored collection of data may be utilized to implement the databases, repositories, file systems, user files, and software shown above. The above-described items stored respectively in the database, repository, file system, user files, software may be stored in different data storage structures or may be stored in a same data storage structure. For instance, the local database 140 may be utilized to store everything indicated above as being stored in the repository 142, or vice versa. The storage devices 110, 138, 160 may be local to the device 104, 130, 160 as shown in FIG. 1 or may be located remote such as on another device coupled to the Internet 104. Information stored in the local storage devices 138, 168 could also be stored in the central storage device 110, or vice versa. For example, the user files 144 may be located on the computer server 104 or may be located on other computer server(s) coupled to the Internet 102 such as Google Drive® or Microsoft's OneDrive®.

Diffs or other parts of files may also be stored in these storage devices, and may be distributed across a plurality of storage devices. In this way, when the above description says to save a copy of a file, this is intended to cover any way of storing information sufficient such that a copy of that file can be recovered, including when done by storing partial copies, diffs, or other information. Examples of tangible, non-transitory computer-readable media that may be utilized to implement the storage devices 110, 138, 168 include optical media (e.g., CD-ROM, DVD discs), magnetic media (e.g., hard drives, diskettes), and other electronically readable media such as flash storage devices and memory devices (e.g., RAM, ROM). The software 116, 146, 176 illustrated in FIG. 1, may include processor-readable instructions such as pre-compiled machine code or may be dynamically compiled on the fly. The processors 106, 132, 162 may be included in one or more general-purpose or specific-purpose computer(s) that become(s) either a client device 130, 160 or the computer server 104 as a result of executing the instructions. In the above description the plural form of the word "processors" has been utilized since it is common for a CPU of a computer to have multiple processors (sometimes also referred to as cores); however, it is to be understood that a single processor may also be configured to perform the described functionality in other implementations.

In another example modification, rather than counting the number of declared hashes and checking if the declared hash count is greater than or less than one at step 612, the server 104 may simply check if all the declared hash values relevant to the user are the same value. This would mean that the group is in alignment. Counting the number of unique hashes is useful to further show how many users are out of alignment across the group but in terms of displaying the group alignment indication 202 in some embodiments what matters is simply whether everyone has the same declared hash or not.

In another example modification, the first and second declared files 122, 124 do not need to be stored on the client devices 130, 160 or the computer server 104. In other words, after a user has declared a working file at step 506, step 508 can be modified to simply associate that file with the conversation (if desired) and then proceed directly to step 510 to generate the declared hash value based on the current content of the file.

In some embodiments, the working hash 150 for a particular working file 154 is stored right in the ADS for that file rather than or in addition to saving in the local database 140. Calculating the working hash 150 at step 522 in advance of when the alignment icon 200 is displayed helps increase the speed of the folder view process by the file manager. For example, with a folder containing several thousand files associated with one or more conversations, the working hashes pre-calculated and stored in the local database 140 or ADS may be used directly as long as the file has not been modified since the hash was last calculated. However, it is not a requirement in other embodiments to store the working hash either in the local database 140 of the file tracking data. Instead, in other embodiments, the working hash 150 for a particular working file 154 is calculated on the fly at the time that an alignment icon 200 needs to be displayed for that file 154. Calculating the working hash 150 on the fly reduces the complexity of the database 140 by preventing the need to store working hashes 150 in the database 140 and then determine whether the stored working hash 150 can still be used or needs to be recalculated.

The server 104 or client devices 130, 160 within system 100 may also send out alerts when the alignment state of a particular conversation or user changes or meets user configurable requirements. For example, a first user may setup an alert to be automatically notified by the computer server 104 whenever that first user is no longer in group alignment with one or more other users in the conversation. Alerts include email alerts, short message service (SMS) alerts, voice alerts, pop-up message, badge or other icon alerts, etc.

In yet other embodiments, the system 100 may be a client 130, 160 distributed system where the server 104 is omitted. In these embodiments, the client devices 130, 160 communicate directly over the network without a central server 104. Each client 130, 160 may therefore also operate as described above for server 104, and vice versa.

Although in the above examples, the terms "user" and "users" are generally intended to refer to human users, client devices 130, 160 may also act as users in other embodiments. For instance, each client device 130, 160 may be considered a separate user regardless of which human user(s) may be utilizing those client devices 130, 160. In general, each conversation may have any number of participants and those participants may monitor alignment of files within the conversation. There is one set of declared state identifier(s) per participant in each conversation according to some embodiments. In many beneficial embodiments, at least some participants in a conversation represent human users who access the system 100 via client devices 130, 160. A single user may have one or multiple client device 130, 160. In embodiments where there is one declared state per participant, a user's declared file(s) do not depend upon which client device 130, 160 the user is utilizing at a particular time. In other words, a user is enabled to change between different client devices 130, 160 after they have declared one or more files, and the user's change of client devices 130, 160 does not affect that user's declared state or other users' declared state(s) that may be in the conversation. Later, from any client device 130, 160, the user can declare another set of one or more files to the conversation and this will update that user's declared state again.

Even a single user in a conversation with no other users may find the system 100 useful to monitor whether the local user files 144, 174 on a particular client device 130, 160 match the state of the user's declared file(s). For example, the user may in the course of working create many copies of a file many with different modifications. The user may forget on which device and at what location they stored the declared version. The local alignment indication 204 described above allows the user to immediately see if a file they are looking at matches their declared version. Beneficially, in many embodiments such as those employing file tracking data stored in an ADS files or within the local database 140 the user can move their files around, rename them and still obtain the benefit of knowing at a glance by the local alignment indication 204 whether a particular copy of a file they are looking at matches their declared version.

In yet another example modification, it may also be beneficial to have one or more computerized agents participate as users in a conversation. For instance, an automated interface agent my couple the system 100 of FIG. 1 with another separate document management system such as SharePoint® or Google drive®, webserver, production deployment system, etc. Once benefit of inviting a separate document management system to participate in a conversation is to allow users to work independently on their own user files 144, 174 but still allow these users to know if they are aligned with a set of documents in the external document management system. When a new version is added to the external document management system such as SharePoint®, the interface agent will automatically declare that new document to the conversation with which it is involved—i.e., the interface agent will proceed from the "yes" branch of step 506 in FIG. 5. Thereafter, as a result of the above-described process, new group alignment status will be received by the other users in the conversation (at step 526) and they will be made aware of alignment with the SharePoint® version. In another embodiment, one or more of the users in the conversation may be designated as the SharePoint® master, and when one of these user(s) in the conversation declares a new version manually 506, the interface agent will receive new group alignment status on behalf of the external document management system and automatically retrieve the newly declared file and check it in to the external document management system.

In yet another example modification, the system 100 may also allow users to distribute files and track alignment status not just across instances of a distributed document which would be defined as being aligned by being binary identical on a bit by bit level, but even across transformations or translations of these files/data sets. Any known and reproducible process which converts one data set into a derivative data set could be supported. This extends the value of the process to people beyond just the collaborators and reviewers generating document content, but out to the consumers of the content whether they are humans or systems.

FIG. 21 illustrates a flowchart describing operations by the computer server 104 of system 100 for handling distribution points according to an exemplary embodiment. The steps of FIG. 21 may be performed by the processors 106 of the computer server 104 executing software 116 loaded from a memory such as storage device 110. The steps of the flowchart in FIG. 21 are not restricted to the exact order shown, and, in other configurations, shown steps may be omitted or other intermediate steps added. In this embodiment, the computer server 104 performs the following operations:

The process begins at step 2100 when a user sets up a distribution point. For example, the user may remotely interact with a user interface (UI) provided by a webserver running on server 104 in order to interact with server 104. The UI in this example includes a button beside an icon of the user's declared file, and the button is labeled, "Publish online." Upon pressing this button, the process proceeds to step 2102. Any other desired methods of allowing a user to initiate setup of a distribution point may be provided in other embodiments. In the following example, the original user who sets up the distribution point is referred to as the sharing user.

At step 2102, the server 104 generates a link such as a unique URL available via the Internet 102. The link is provided by the server 104 to the sharing user. The sharing user may thereafter send the link to other people via email, instant message, or other communication mechanisms. The link is unique and is associated with the particular conversation. In this way, a sharing user may generate a separate distribution point link for any conversation in which they are participating. Likewise, as explained in more detail below, multiple links may be generated by a particular sharing user for a single conversation in order to provide different versions of the declared file (e.g., raw and translated).

At step 2104, the server 104 determines whether it has received an incoming request at the link. An incoming request may occur when a user or client device 130, 160 accesses the link such as by clicking on the link in a web browser or email program. In the rest of this example, the user that accesses the link is referred to as the requesting user. It is worth noting that the requesting user will generally be different than the sharing user but it also is possible that these two users may be the same user.

At step 2106, the server 104 retrieves the currently declared file 123, 125 for the sharing user who originally set up the distribution point link at step 2100. The currently declared file 123, 125 for the sharing user at that time the incoming request is received at step 2014 may be different than the declared file 123, 125 for the sharing user at the time that the link was originally created at step 2100. The currently declared file 123, 125 will typically be stored on the server 104 assuming the user has elected to share the file with the server 104 at step 514 of FIG. 5, alternatively, the declared file 123, 125 may be stored at another location and the server 104 automatically retrieves it at this step.

At step 2108, the server 104 determines whether translation of the currently declared file 123, 125 is required. In some embodiments, there are different kinds of publishing such as publishing the raw central version of the declared file 123, 125 itself (either encrypted and/or unencrypted), or publishing a translated version of the file 123, 125. In this example, it is assumed that either the raw declared file 123, 125 for the sharing user is distributed or the declared file 123, 125 is first translated to another format such as a portable document format (PDF) before being distributed. Whether or not translation is required may depend upon the settings for the distribution point selected at the time of the link set up at step 2100. Alternatively, both raw and translated publication may be available and selectable by the requesting user by providing a parameter specifying whether translation is to be performed in the link. Alternatively, the server 104 may generate at step 2102 a first link that specifies translation is required and a second link that specifies that translation is not required. Whether or not translation is required at step 2108 in this case depends on which link was accessed.

At step 2110, because translation is required, the server 104 translates the user's declared file 123, 125 to form a translated file. Examples of translation including the server 104 automatically printing to PDF the user's currently declared Word file, rendering to PDF a user's currently declared HTML file, or compiling to machine executable format a user's currently declared source code file.

At step 2112, the server 104 sends the translated file to the requesting user. In this way, the requesting user clicks or otherwise accesses the link and receives a translated version of the currently declared file for the sharing user who originally setup the distribution point.

At step 2114, because translation is not required, the server 104 sends the raw version of the sharing user's currently declared file 123, 125 to the requesting user. As previously mentioned, the raw version of the user's currently declared file 123, 125 stored at the server 104 may already be in an encrypted format.

At step 2116, the server 104 determines whether the link has been deleted. Deletion of the link may occur at any time desired by the sharing user. For instance, the sharing user may simply login to the web interface at the server and delete the distribution point. In another options, when the sharing user sets up the distribution point, an expiry setting may be configured. The expiry setting may cause the server 104 to automatically delete the distribution point at a predetermined date or time, or after a predetermined number of clicks, or in response to receiving an incoming request from a predetermined IP address, or upon receiving an incoming request with a predetermined code included as a parameter on the link, etc.

At step 2118, the server 104 deletes the distribution point; thereafter, requesting users who click the link generated at step 2102 will receive an error message such as "file not found" or "link expired".

When the requesting user receives either the declared file or the translated file in response to steps 2114, 2112, respectively, an application program running on the requesting user's client device 130, 160 may associate the received file with a particular conversation. For example, the client device 130, 160 may add the conversation identifier and possibly other relevant data to the ADS or similar file structure associated with the received file. Extended file attributes and resource forks may be utilized in a similar manner in addition to the ADS as described above. The requesting user's client device 130, 160 may then perform the icon overlay process of FIG. 9 in conjunction with the received file. Thus, even though the received file may be a totally different file format such as a PDF file created at step 2110 from a declared Word file, the PDF file can be displayed on the requesting user's client device 130, 160 with group alignment information such as the group alignment indication 202 overlaid on the PDF file icon in a file manager program. In this way, the requesting user can visually see whether the PDF file they are working with is still aligned with the group of users working on the source Word document in the conversation from which the distribution point was originally set up.

As shown in the above example, the links themselves are not the distributed document, but rather a point of distribution. When combined with the group alignments states between people/systems, any user in a conversation can see whether they are in alignment with the distributed file available at the link. Likewise, these distribution points may distribute transformations of the declared file. Also, while the distribution point may send out a file when the link is accessed, the distribution point may also send out a datastream for consumption by any requesting user or requesting process, for example, audio devices, video devices, printers, etc.

In a more specific application example, distribution points may be useful when creating key performance indicator (KPI) calculation engines in the process control fields. Programmable logic controller (PLC) code embedded in control systems is often different from the documented calculations. Or, calculation code is stored within a database, but that is not in line with the documented KPI definitions. Control systems are often behind a firewall, so links between systems is highly restrictive. The system 104 including the distribution point links of FIG. 21 allows alignment to be maintained and known between the definitions and their implementations.

In another exemplary use-case scenario, a particular user account may be created for a document manager. The document manager joins a conversation and sets up a distribution point link at step 2100 to publish a document such as a human resources checklist for hiring a new employee. Various entities such as the legal department, executives, information systems managers, etc. may be involved in drafting the checklist in Word form. The document manager may at any time accept any of the user's declared files and then requesting users who access the link generated at step 2102 will get the latest version of the checklist as accepted by the document manager. Likewise, rather than receiving the Word copy, the server 104 may provide the requesting user with a translated version such as providing the checklist in PDF form.

The system 104 may also communicate alignment status across different types of media. For instance, as indicated above, a print driver may print hashes or other file state identifiers on printouts of any document. The printed hash or other state identifier connects the versioning to the original source document as opposed to the PDF or equivalent file with no need for manually alter the source file to contain an identifier (i.e. version). The translation step 2110 of FIG. 21 may also include overlaying the hash or other state identifier as a watermark on the PDF version. Thus, at a later time the requesting user can compare the state identifier overlaid on the PDF version with the state identifier of the currently declared file for the sharing user. If the two are different, the requesting user can obtain the newer version by accessing the distribution point link.

As for generating the PDF (or other file format) during the translation or printing process, in some embodiments an isolated host computer is utilized such as a virtual instance of Windows running on server 104. The virtual instance is configured to support a printer driver to convert files to PDF file type among other desired formats like gifs, jpegs, etc. The server 104 takes a requested source document, stores it in a unique location in the virtual instance, and renames it with its unique file state ID (e.g., content hash) along with its known file extension which matches the file extension of the latest check-in for the requested file. The server 104 then uses the Windows operating system in the virtual instance to print the file to PDF, and Windows in turn uses the file extension to determine which application is registered to know how to open the file and print it. The print driver configuration is configured to overlay the filename of the document minus the file extension on a specific location of the document similar to a watermark. In this way, the PDF file includes the state ID of the source document overlaid on the content ready for printing. Beneficially, this embodiment leverages the capabilities of existing print drivers to overlay watermarks using the filename of the file being printed minus the extension. Out-of-the-box print drivers may therefore be utilized to provide this new functionality of overlaying the file state identifier (e.g., content hash) of the source file that was printed to create the PDF.

In some embodiments, the server 104 caches the outputted PDF file, which is beneficial if the source file contained dynamic data such as date fields that may be intended to change to always show current system time. By caching the resulting PDF output file, the server 104 can simply send the cached version of the PDF file (i.e., the translated file at step 2112) without first re-translating the file at step 2110 as long as the source document has the same file state ID (i.e., the same content hash). For instance, if the sharing user has the same declared file when a subsequent incoming link request is received at step 2104, the server 104 may replace step 2110 with a new step entitled 'load previously cached translated file', which is then sent to the user at step 2112.

In yet other example modifications, push mechanisms for file distribution may be employed instead of requesting users needing to request files at the links as described above. For instance, upon a sharing user setting up a distribution point at step 2100, the sharing user may configure a push action such as causing the server 104 to push the newly declared file to a particular location. The particular location may be a shared directory available on a company intranet where employees can find the latest versions of documents. In this way, upon the document manager (i.e., the sharing user) accepting a new version of a human resources checklist, the server 104 may automatically push a copy, either the raw file itself or a translated version at steps 2114, 2112 to the shared directory. This will replace the previous version of the file in that directory. Going forward, as employees access the directory they will find the newest version. Likewise, other members of the conversation who are working on the document with the document manager, will be able to see whether they are currently aligned with the version that has been automatically pushed to the shared folder (i.e, the document manager's declared version). Any desired trigger for the push action can be configured.

Another part of setting up the distribution point at step 2100 and/or accessing the link at step 2104 may involve configuring the type of translation to be performed. Some types of source documents may be translatable in multiple ways. For instance, HTML source code may be translated into a PDF document as either the colour-coded source code for review by developers or as rendered web page. Thus, the sharing user and/or the requesting user may send commands to the server 104 to specify the type of translation desired. The commands may include selecting the type of translation in advance, generating different links for different types of translation, or providing predetermined parameters when accessing the link, for example.

The declaration process may also involve the client device 130, 160 and/or server 104 initiating file updates. For instance, FIG. 5 may be modified to add another step after the "yes" branch of step 506 such as between steps 506 and 508. The new step involves updating other working files 154, 184 to match the newly declared file. In some embodiments, both the client device 130, 160 and server 104 have stored metadata for a particular conversation that indicates the file location of each working file 154, 184 associated with the conversation. In response to a particular user declaring a new file for the conversation on the first client device 130 at step 506, the processor 132 of the client device 130 searches the local database 140 to find which other user files 144 are also associated with that conversation, i.e., to find the other working files 154 associated with the conversation. For example, the user may have multiple copies of Word files located in different directories on their C: drive, D: drive, and/or other drives, and each of the Word files are associated with the conversation and the location of each of these working files 154 is stored in the database 140. The processor 130 automatically replaces one or more of the Word file working files 154 with the newly declared file after the user declares the new declared file 122 at step 506. Whether the client device 130 automatically replaces a particular working 154 file may be a user-configurable setting, and the user configuration options may allow the user to individually or as a group select to update particular file locations at future times when the user declares a new file for the conversation at step 506.

When a working file 154, 184 is automatically updated to match a newly declared file, the client device 130, 160 and/or server 104 may store a copy of the pre-updated working file 154 in the repository 142, 172, 114. In this way, if the user later wants to revert back to that version of the working file 154, 184 it is still available.

In addition to the particular user's local client device 130 automatically updating working files 154, 184 associated with the conversation on that client device's 130 local user files 144, the server 104 may also push updates out to other storage locations either in the cloud or on other user devices 160 associated with the user. For instance, a single user may work on multiple client devices 130, 160 such as a desktop at work and a laptop at home. Each client device 130, 160 may have its own set of user files 144, 174, and there may be multiple copies of a particular user's working files 154, 184 spread across these machines. One benefit of automatically updating these working file 154, 184 copies to become the latest declared file 122, 124 is that the user is prevented from forgetting to update the working files 154, 184 when they switch to a new client device 130, 160.

The automatic update may involve a push notification from the server 104 to a client device 130, 160, or may involve the client devices 130, 160 periodically or occasionally polling the server 104 in order to check whether there are any local working files 154, 184 that need to be updated. The sever 103 may store a push flag that clients 130, 160 repeatedly check via the Internet 102 in order to determine whether a working file 154, 184 needs to be updated. In such embodiments, the server 102 sends a message via network 102 to the client device 130, 160 identifying the conversation identifier and providing a copy of the newly declared file 122, 124. The receiving client device 130, 160 then parses the database 140, 170 to determine all file locations that need to be updated and performs the update on those files. The end result is that when a user declares a new declared file 122 on a first client device 130, the update is pushed out to other client devices 160. Thereafter, when the user moves to a second client device 160, the older working files 184 associated with the conversation on the second client device 16 have already been updated to match the user's newly declared file 122.

Automatically pushing updates of declared files to different file locations can also be beneficial when the user has a two directories (either local or remote) where one of the directories is for testing code and the other directory is for production code. The user may do their actual work on a first working file 154 in the test directory and find that they are satisfied with the state of the first working file 154. The user then declares that first working file 154 at step 506 and the system 100 automatically updates a corresponding second working file 184 in the production directory to match the first working file 154. As mentioned, the first working file 154 and second working file 184 may be stored on the same or different physical device.

In addition to pushing out updated versions of declared files 122. 124 in raw format, the above-described translation processes similar to at step 2110 may also be performed when performing an automatic file update. For example, when a user declares a new Word file to a particular conversation at step 506, a PDF file in a shared directory specified by the user may be automatically replaced with the PDF printout of the Word file (i.e., a translation operation similar to step 2110 is performed to translate the user's newly declared Word file to PDF format for storage in another file location).

Although the above examples have focused on automatically updating files for a particular user within a particular conversation, the same idea can also be expanded to other users and other conversations. For example, when a first user declares a new file to a particular conversation, working files associated with the conversation and owned by a second user may be automatically updated to match the newly declared file from the first user. Likewise, in another example, when a first user declares a new file to a particular conversation, another user's working files in another conversation may be automatically updated to match.

The server 104 may also store all correspondence associated with a particular conversation for display in a blog or other chronological order. For example, a group of users may be working on a particular project and join a conversation in order to track group alignment with other users in the conversation. During this period of time, the users may wish to have a voice meeting using voice-over-IP software (VOIP) and may configure the server 104 to attend the meeting and make a recording of the meeting. This may be done by either hosting the meeting using a VOIP platform hosted on the server 104 or may alternatively be done with an external provider such as Skype® but having the server 104 attend the meeting and make an audio and/or video recording of the proceedings. To protect privacy, all users may need to expressly agree by agreeing to a warning dialog box before the recording to take place. After recording of the meeting is complete, the server 104 then stores the audio file of the meeting and/or an automatically generated transcript as metadata within the conversation. The time and date of the meeting is stored to allow for sorting in chronological order. Transcripts may be generated by the server 104 providing the audio recording file to a speech-to-text transcription service, which may be a service running on the server 104 itself or may be an external service run on another server and accessed via a network-based API.

Likewise, the server 104 may act as an intermediate relay for emails, SMS, and/or other instant messaging protocols so that all correspondence related to the project is captured and stored by the server 104 as meta data within the conversation. Email directed to users will have a from or reply-to address of the server 104. In this way, users may correspond with each other in any of their preferred ways while still allowing the server 104 to capture and record the correspondence. Users may thereafter browse the correspondence in a blog or other listing on the server 104 in order to remember why certain changes took place. Likewise, when the project is completed, the entire archive including all revisions of the declared files and correspondence can be packaged up by the server 104 for archiving. For example, a ZIP file or other archive of the entire conversation may be provided by the server 104 to each of the users in the conversation at the time the conversation is closed (i.e., at project completion).

The server 104 may also allow users to select any file revisions within a conversation for comparison and then generate a comparison file for transmission down to the client device 130, 160. The comparison file may have a predetermined file type with a format that includes each of the selected file revisions. The client device 130, 160 opens the file, extracts the selected files, and performs the comparison using any applicable compare tool. In this way, the users don't need to manually input different files into their compare tool. Likewise, comparisons may also be done on the server such that no client software is required. Compares may be done between two or more files, and the server 104 automatically marks changes in the name of the user according to who declared the files selected for comparison.

In another example modification, rather than being software 116, 146, 176 executed by one or more processors 106, 132, 162, the above-described functionality may be implemented as hardware modules configured to perform the above-described functions. Examples of hardware modules include combinations of logic gates, integrated circuits, field programmable gate arrays, and application specific integrated circuits, and other analog and digital circuit designs. Functions performed by single devices described above may also be separated into multiple devices, or the functions of multiple devices may be combined into a single device. Unless otherwise specified, features described may be implemented in hardware or software according to different design requirements. In addition to a dedicated physical computing device, the word "server" may also mean a service daemon on a single computer, virtual computer, or shared physical computer or computers, for example. All combinations and permutations of the above described features and embodiments may be utilized in conjunction with the invention.

What is claimed is:

1. A system for monitoring content alignment of files across a group of different users, the system comprising:
   a plurality of client devices at least including a first client device and a second client device; and
   a computer server coupled to each of the client devices via a network;
   wherein a first user of the group selects a first file to declare as their new declared version to the group utilizing a user interface of the first client device, the first file selected to be declared hereinafter being referred to as a first declared file, and the first user selecting the first file to declare hereinafter being referred to as the first user declaring the first declared file;
   in response to the first user declaring the first declared file, the first client device is operable to calculate a first declared hash value and send the first declared hash value to the computer server via the network, the first declared hash value being calculated by the first client device running a hash function on a content of the first declared file at a point in time that the first declared file is declared;
   the computer server is operable to store the first declared hash value received from the first client device along with any other declared hash values received from other users in the group;
   a second user of the group selects a second file to declare as their new declared version to the group utilizing a user interface of the second client device, the second file selected to declare hereinafter being referred to as a second declared file, and the second user selecting the second file to declare hereinafter being referred to as the second user declaring the second declared file;
   in response to the second user declaring the second declared file, the second client device is operable to calculate a second declared hash value and send the second declared hash value to the computer server via the network, the second declared hash value being calculated by the second client device running the hash function on a content of the second declared file at a point in time that the second declared file is declared;
   the computer server is operable to store the second declared hash value received from the second client device;
   in response to receiving the second declared hash value from the second client device, the computer server is operable to compare a plurality of declared hash values of the group including the first declared hash value and the second declared hash value in order to determine whether there is more than one unique declared hash value for the group, and then send at least a first message to the first client device via the network, the first message including a group alignment status specifying whether or not all users in the group have a same declared hash value;

the first client device is operable to automatically display a group alignment indication utilizing the user interface of the first client device, the group alignment indication being an icon overlay on a file icon representing the first file as shown by a file manager running on the first client device, the group alignment indication being overlaid on the file icon from the point in time that the first file is declared; and in response to receiving the group alignment status from the computer server, the first client device is operable to update the group alignment indication according to the group alignment status received from the computer server, the first client device updating the group alignment indication to show an aligned state when the first message specifies that all users of the group have the same declared hash value and to show a not aligned state when the first message specifies that not all users of the group have the same declared hash value, the group alignment indication thereby making the first user aware of whether the content of the first declared file matches content of declared files by all other users in the group.

2. The system of claim 1, wherein:

in response to receiving the second declared hash from the second client device, the computer server is further operable to send a second message to the second client device via the network, the second message including the group alignment status specifying whether or not all users in the group have the same declared hash value; and after receiving the second message, the second client device is operable to automatically update a second group alignment indication on the user interface of the second client device according to the group alignment status received from the computer server, the second client device updating the second group alignment indication to show an aligned state when the second message specifies that all users of the group have the same declared hash value and to show a not aligned state when the second message specifies that not all users of the group have the same declared hash value, the second group alignment indication thereby making the second user aware of whether the content of the second declared file matches content of declared files by all other users in the group.

3. The system of claim 1, wherein:

the first user utilizes the user interface of the first client device to select a first working file that is accessible to the first client device to declare to the group; and the first client device is operable to store a copy of the first working file at a time that the first working file is selected to be declared, the copy of the first working file forming the first declared file.

4. The system of claim 3, wherein the first client device is further operable to upload a version of the first declared file to the computer server via the network after the first working file is selected to be declared.

5. The system of claim 4, wherein the computer server is further operable to transmit the version of the first declared file from the computer server to the second client device via the network in response to receiving a download request from the second client device.

6. The system of claim 4, wherein the version of the first declared file that is uploaded to the computer server is an encrypted version of the first declared file.

7. The system of claim 3, wherein the first client device is further operable to:

calculate a first working hash value by running the hash function on a content of the first working file at a later time after the first user has selected the first working file to declare;

compare the first working hash value with the first declared hash value; and automatically display a local alignment indication on the user interface of the first client device showing whether the first working hash value equals the first declared hash value thereby making the first user aware of whether the content of the first working file still matches the content of the first declared file.

8. The system of claim 7, wherein the first client device is operable to automatically display both the group alignment indication and the local alignment indication as one or more icon overlays on a file icon representing the first working file shown by the file manager running on the first client device.

9. The system of claim 4, wherein:

the first user utilizes the user interface of the first client device to join the first working file to a conversation having a particular conversation identifier;

the first client device is operable to inform the computer server via the network that the first declared file formed from the first working file is associated with the particular conversation identifier; and the computer server is operable to send the first message only when both the first declared file and the second declared file are associated with the particular conversation identifier.

10. The system of claim 3, wherein the first client device is operable to associate the first working file with the first declared file by storing file tracking data for the first working file, the file tracking data being one of an alternative data stream for the first working file, a data fork of the first working file, or an extended attribute of the first working file.

11. The system of claim 1, wherein:

in response to the first user interacting with the user interface of the first client device, the first client device sends to the computer server information linking the first user and the second user for group alignment monitoring purposes; and the computer server is operable to send the first message only when the first user associated with the first declared file is linked to the second user associated with the second declared file for group alignment monitoring purposes.

12. The system of claim 1, wherein:

the first declared file is stored at a first storage location not accessible to the second client device; and the second declared file is stored at a second storage location not accessible to the first client device.

13. The system of claim 12, wherein neither the first storage location nor the second storage location are accessible to the computer server.

14. The system of claim 1, wherein:

the first client device is further operable to calculate utilizing the hash function a plurality of first declared hash values corresponding to a plurality of first declared files, and send the plurality of first declared hash values to the computer server via the network, the first declared hash values respectively corresponding to contents of the first declared files at a point in time that the first declared files are selected to be declared by the first user;

the second client device is further operable to determine a plurality of second declared hash values corresponding to a plurality of second declared files, and send the plurality of second declared hash values to the computer server via the network, the second declared hash values respectively corresponding to contents of the second declared files at a point in time that the second declared files are selected to be declared by the second user;

the computer server is further operable to compare the plurality of first declared hash values and the plurality of second declared hash values, and then send at least the first message to the first client device via the network, the first message including the group alignment status specifying whether the plurality of first declared hash values are the same as the plurality of the second declared hash values; and the first client device is further operable to automatically update the group alignment indication displayed on the user interface of the first client device according to the group alignment status received from the computer server, the group alignment indication thereby further making the first user aware of whether the contents of the first declared files match the contents of the second declared files.

15. The system of claim 14, wherein:

the first user utilizes the user interface of the first client device to select a first working folder that is accessible to the first client device as a first declared folder; and the first client device is operable to store a copy of the first working folder at a time that the first working folder is selected to be declared, the copy of the first working folder holding the first declared files.

16. The system of claim 15, wherein the first client device is further operable to:

calculate the plurality of first declared hash values by running the hash function on each file in the first declared folder at the point in time when the first declared folder is declared;

calculate a plurality of first working hash values by running the hash function on each file in the first working folder at a later time after the user has declared the first working folder;

compare the plurality of first working hash values with the plurality of first declared hash values; and automatically display a local folder alignment indication on the user interface of the first client device showing whether the plurality of first working hash values match the plurality of first declared hash values thereby making the user of the first client device aware of whether file contents of the first working folder still match file contents of the first declared folder.

17. The system of claim 16, wherein the first client device is operable to automatically display both the group alignment indication and the local folder alignment indication as one or more icon overlays on a folder icon representing the first working folder shown by a file manager running on the first client device.

18. A computer server for monitoring content alignment of files across a group of different users, the computer server comprising:

a network interface coupled via a network to a plurality of client devices at least including a first client device and a second client device;

a storage device; and one or more processors coupled to the network interface and the storage device;

wherein, by the one or more processors executing software instructions loaded from the storage device, the one or more processors are configured to:

receive a first declared hash value from the first client device and store the first declared hash value in the storage device, the first declared hash value corresponding to a hashed value of a content of the first declared file at a point in time that the first declared file is selected to be declared by a user of the first client device as their new declared version to the group;

receive a second declared hash value from the second client device and store the second declared hash value in the storage device, the second state identifier corresponding to a hashed value of a content of the second declared file at a point in time that the second declared file is selected to be declared by a user of the second client device as their new declared version to the group;

store the first declared hash value and the second declared hash value in the storage device along with any other declared hash values received from other users in the group;

in response to receiving the second declared hash value from the second client device, compare a plurality of declared hash values of the group including the first declared hash value and the second declared hash value to determine whether there is more than one unique declared hash value for the group; and send at least a first message to the first client device via the network, the first message including a group alignment status specifying whether or not all users in the group have a same declared hash value;

wherein the first client device thereafter automatically updates a group alignment indication displayed on a user interface of the first client device in response to receiving the group alignment status from the computer server, the first client device updating the group alignment indication to show an aligned state when the first message specifies that all users of the group have the same declared hash value and to show a not aligned state when the first message specifies that not all users of the group have the same declared hash value, the group alignment indication thereby making the user of the first client device aware of whether the content of the first declared file matches content of declared files by all other users in the group.

19. The computer server of claim 18, wherein the one or more processors are further configured to:

in response to receiving the second declared hash from the second client device, send a second message to the second client device via the network, the second message indicating whether the first declared hash value equals the second declared hash value;

wherein, after receiving the second message, the second client device updates a group alignment indication displayed on the user interface of the second client device showing whether the first declared hash value equals the second declared hash value thereby also making the second user aware of whether the content of the first declared file matches the content of the second declared file.

20. A method of monitoring content alignment of files across a group of different users, the method comprising:

calculating a first declared hash value corresponding to a content of first declared file at a point in time that the first declared file is selected to be declared to the group by a first user, the first declared file being associated with a first client device;

determining a second declared hash value corresponding to a content of a second declared file at a point in time that the second declared file is selected to be declared to the group by a second user, the point in time that the second declared file is selected to be declared being after the point in time that the first declared file is selected to be declared, the second declared file being associated with a second client device;

storing the first declared hash value and the second declared hash value along with any other declared hash values received from other users in the group at a computer server coupled to the first and second client devices via a computer network;

comparing by the computer server a plurality of declared hash values of the group including the first declared hash value and the second declared hash value in order to determine whether there is more than one unique declared hash value for the group;

sending at least a first message by the computer server to the first client device via the computer network, the first message including group alignment status specifying whether or not all users in the group have a same declared hash value;

displaying a group alignment indication on a user interface of the first client device from the point in time that the first file is declared, the group alignment indication being an icon overlay on a file icon representing the first file as shown by a file manager running on the first client device; and automatically updating the group alignment indication displayed on the user interface of the first client device in response to receiving the group alignment status from the computer server, updating the group alignment indication to show an aligned state when the first message specifies that all users of the group have the same declared hash value and to show a not aligned state when the first message specifies that not all users of the group have the same declared hash value, the group alignment indication thereby making the first user aware of whether the content of the first declared file matches content of declared files by all other users in the group.

* * * * *